us009760503B2

(12) United States Patent
Oh et al.

(10) Patent No.: US 9,760,503 B2
(45) Date of Patent: Sep. 12, 2017

(54) OPERATION METHOD OF MEMORY CONTROLLER AND NONVOLATILE MEMORY SYSTEM INCLUDING THE MEMORY CONTROLLER

(71) Applicant: SAMSUNG ELECTRONICS CO., LTD., Suwon-si, Gyeonggi-Do (KR)

(72) Inventors: Sang-Jin Oh, Suwon-si (KR); Jisoo Kim, Yongin-si (KR); Seung-Jae Lee, Seoul (KR); Moonsang Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 263 days.

(21) Appl. No.: 14/822,321

(22) Filed: Aug. 10, 2015

(65) Prior Publication Data

US 2016/0048459 A1 Feb. 18, 2016

(30) Foreign Application Priority Data

Aug. 18, 2014 (KR) .................. 10-2014-0107128

(51) Int. Cl.
*G06F 12/14* (2006.01)
*G06F 12/02* (2006.01)
*G06F 21/44* (2013.01)
*G06F 21/57* (2013.01)

(52) U.S. Cl.
CPC ........ *G06F 12/145* (2013.01); *G06F 12/0246* (2013.01); *G06F 21/44* (2013.01); *G06F 21/575* (2013.01); *G06F 2212/1052* (2013.01); *G06F 2212/2022* (2013.01); *G06F 2212/7201* (2013.01)

(58) Field of Classification Search
CPC .... G06F 12/145; G06F 12/0246; G06F 21/44; G06F 21/575
USPC ....... 711/103, 151, 154, 156, 165, 170, 202; 365/185.33; 713/1, 2
See application file for complete search history.

(56) References Cited

U.S. PATENT DOCUMENTS

| 6,717,956 | B1 | 4/2004 | Fan et al. | |
|---|---|---|---|---|
| 6,986,015 | B2 * | 1/2006 | Testardi | G06F 3/0601 710/38 |
| 7,173,929 | B1 * | 2/2007 | Testardi | G06F 3/0611 370/353 |
| 7,280,536 | B2 * | 10/2007 | Testardi | G06F 3/0611 370/353 |

(Continued)

*Primary Examiner* — Stephen Elmore
(74) *Attorney, Agent, or Firm* — Volentine & Whitt, PLLC

(57) ABSTRACT

A nonvolatile memory system includes a nonvolatile memory device having a physical storage area, and a memory controller managing the physical storage area on the basis of first and second logical areas. The memory controller is configured to receive a logical block address range corresponding to a part of the first logical area and a command from a host and is configured to receive data, a logical block address and a write command from the host to perform an update with respect to the second logical area. When, in the update operation, the received logical block address is included in the logical block address range, the memory controller, in response to the write command, redirects the received logical block address to a logical page number of the second logical area so that the data is written in the second logical area.

20 Claims, 22 Drawing Sheets

(56) References Cited

U.S. PATENT DOCUMENTS

| | | | |
|---|---|---|---|
| 7,743,203 B2 * | 6/2010 | France | G06F 12/0246 365/185.29 |
| 8,442,938 B2 | 5/2013 | Ougarov et al. | |
| 8,539,246 B2 | 9/2013 | Seethaler et al. | |
| 8,566,603 B2 | 10/2013 | Cox et al. | |
| 8,713,250 B2 | 4/2014 | Nakamura et al. | |
| 8,782,389 B2 * | 7/2014 | Dolgunov | G06F 9/4401 713/1 |
| 9,158,672 B1 * | 10/2015 | Zheng | G06F 12/0246 |
| 9,229,854 B1 * | 1/2016 | Kuzmin | G06F 12/0246 |
| 9,336,129 B2 * | 5/2016 | Bennett | G06F 12/0246 |
| 9,652,376 B2 * | 5/2017 | Kuzmin | G06F 12/0246 |
| 2005/0204058 A1 | 9/2005 | Philbrick et al. | |
| 2010/0011350 A1 | 1/2010 | Zayas | |
| 2010/0255883 A1 | 10/2010 | Takahashi | |
| 2011/0320801 A1 | 12/2011 | Nimura et al. | |
| 2012/0233396 A1 | 9/2012 | Flynn et al. | |
| 2012/0254602 A1 | 10/2012 | Bhansali et al. | |
| 2013/0024682 A1 | 1/2013 | Dolgunov et al. | |
| 2013/0205067 A1 | 8/2013 | Kettner | |
| 2013/0205068 A1 | 8/2013 | Kettner | |
| 2015/0301747 A1 * | 10/2015 | Sokolov | G06F 3/0608 711/173 |

* cited by examiner

OPERATION METHOD OF MEMORY CONTROLLER AND NONVOLATILE MEMORY SYSTEM INCLUDING THE MEMORY CONTROLLER

CROSS-REFERENCE TO RELATED APPLICATIONS

The present application claims priority under 35 U.S.C. §119 of Korean Patent Application No. 10-2014-0107128, filed on Aug. 18, 2014, in the Korean Intellectual Property Office, the entire contents of which are hereby incorporated by reference.

BACKGROUND OF THE INVENTION

The inventive concept is related to semiconductor memories, and more particularly, to an operation method of a memory controller and a nonvolatile memory system including the memory controller.

A semiconductor memory device is a memory device which is fabricated using semiconductors such as silicon (Si), germanium (Ge), gallium arsenide (GaAs), indium phosphide (InP), and the like. Semiconductor memory devices may be classified into volatile memory devices and nonvolatile memory devices.

The volatile memory devices may lose stored contents at power-off. The volatile memory devices include a Static RAM (SRAM), a Dynamic RAM (DRAM), a Synchronous DRAM (SDRAM), etc. In contrast, the nonvolatile memory devices may retain stored contents even at power-off. The nonvolatile memory devices include, for example, a Read Only Memory (ROM), a Programmable ROM (PROM), an Electrically Programmable ROM (EPROM), an Electrically Erasable and Programmable ROM (EEPROM), a flash memory device, a Phase-change RAM (PRAM), a Magnetic RAM (MRAM), a Resistive RAM (RRAM), a Ferroelectric RAM (FRAM), etc.

A flash memory is being used in various fields because of low power consumption, a low noise, a large capacity, etc. As flash memory devices having large capacity are used in various fields, various security technologies with respect to a flash memory are being developed. For example, encryption technologies such as an FDE (full disk encryption) of encrypting a drive based on encryption software, and an SED (self encryption drive) when a drive performs an encryption for itself, are being provided.

The SED not only performs an encryption and a decoding but also supports a pre-boot authentication for itself. When a host connected to an SED is booted or the SED is linked-up to the host, the host loads a pre-boot area instead of loading a user area of the SED to perform a pre-boot authentication operation. Since the host can access the user area of the SED only when the pre-boot authentication is succeeded, the user area is protected. A function for the authentication operation described above is provided on the basis of a shadow MBR (shadow-master boot record). In the case of an update of the shadow MBR, since the host cannot recognize the shadow MBR, a separate update or a management method may be required.

SUMMARY

Embodiments of the inventive concept provide a nonvolatile memory system. The nonvolatile memory system may include a nonvolatile memory device comprising a physical storage area, and a memory controller managing the physical storage area on the basis of first and second logical areas. The memory controller is configured to receive a logical block address range corresponding to a part of the first logical area and a command from a host and is configured to receive data, a logical block address and a write command from the host to perform an update with respect to the second logical area. When, in the update operation, the received logical block address is included in the logical block address range, and the memory controller, in response to the write command, redirects the received logical block address to a logical page number of the second logical area so that the data is written in the second logical area.

Embodiments of the inventive concept also provide a nonvolatile memory system. The nonvolatile memory system may include a nonvolatile memory device comprising a physical storage area, and a memory controller configured to manage the physical storage area on the basis of first, second and third logical areas. The memory controller is configured to receive a logical block address range corresponding to a part of the first logical area and a command from a host, and receive data, a logical block address and a write command from the host to perform an update with respect to the second logical area. When the received logical block address is included in the logical block address range, the memory controller, in response to the write command, is configured to redirect the received logical block address to a logical page number of the third logical area so that the data is written in the third logical area.

Embodiments of the inventive concept also provide an operation method of a memory controller managing a physical storage area of a nonvolatile memory device on the basis of first and second logical areas. The operation method may include receiving a logical block address range and a command corresponding to a part of the first logical area from a host, and receiving a logical block address, a write command, and data from the host to update the second logical area. Receiving a logical block address, a write command, and data from the host to update the second logical area comprises, when the received logical block address is included in the logical block address range, redirecting the logical block address to a logical page number of the second logical area so that the data is written in the second logical area.

BRIEF DESCRIPTION OF THE FIGURES

Preferred embodiments of the inventive concept will be described below in more detail with reference to the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF PREFERRED EMBODIMENTS

Figure 1:
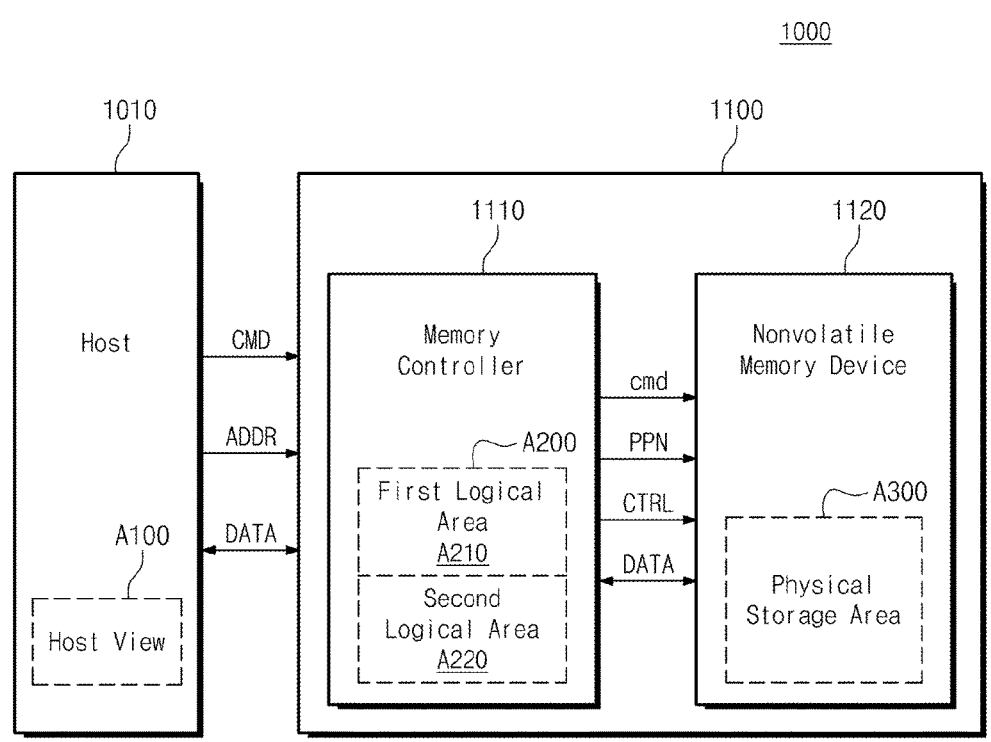
FIG. 1 is a block diagram illustrating a user system in accordance with an embodiment of the inventive concept.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a user system in accordance with an embodiment of the inventive concept. The user system 1000 may be provided by a computing system such as an ultra mobile PC (UMPC), a workstation, a net-book, a personal digital assistants (PDA), a portable computer, a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, a three dimensional television, a smart television, a digital audio recorder, a digital audio player, a digital picture recorder, a digital picture player, a digital video recorder, a digital video player, etc.

The user system 1000 includes a host 1010 and a nonvolatile memory system 1100. The host 1010 may store data DATA in the nonvolatile memory system 1100 or read data DATA stored in the nonvolatile memory system 1100. For example, the host 1010 may transmit a logical block address LBA and a command CMD to the nonvolatile memory system 1100 to read data DATA stored in the nonvolatile memory system 1100 or store data DATA in the nonvolatile memory system 1100.

The host 1010 may communicate with the nonvolatile memory system 1100 on the basis of at least one of various interface protocols such as a universal serial bus (USB) protocol, a multimedia card (MMC) protocol, an embedded MMC protocol, a peripheral component interconnection (PCI) protocol, a PCI-express protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, a mobile industry processor interface (MIPI) protocol, a universal flash storage (UFS) protocol, a nonvolatile memory express (NVMe) protocol, a WIFI protocol, a Bluetooth protocol, etc.

The nonvolatile memory system 1100 may include the memory controller 1110 and the nonvolatile memory device 1120. The memory controller 1110 and the nonvolatile memory device 1120 may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

The memory controller 1110 may control the nonvolatile memory device 1120 in response to signals received from the host 1010.

The nonvolatile memory device 1120 may store data DATA or transmit stored data DATA to the memory controller 1110 under a control of the memory controller 1110. It is assumed that the nonvolatile memory device 1120 is based on a NAND flash, but a technical spirit of the inventive concept is not limited thereto. The nonvolatile memory device 1120 may be embodied on the basis of nonvolatile memory devices such as a NAND flash, a NOR flash, a MRAM, a FRAM, a ReRAM, a PRAM, etc.

The nonvolatile memory system 1100 may support a self-encryption drive (SED) function. The SED may perform an encryption and a decoding for itself, and support a pre-boot authentication. In some embodiments, the pre-boot authentication may include various authentication methods such as a password, a voice certification, a fingerprint certification, an authentication, a device identification (device ID), etc.

The memory controller 1110 may manage the physical storage area A300 of the nonvolatile memory device 1120 on the basis of a logical storage area A200. The memory controller 1110 may manage a corresponding relation between logical page numbers LPN of the logical storage area A200 and a physical page number PPN of the physical storage area A300 of the nonvolatile memory device 1120. The logical storage area A200 may be divided into first and second logical areas A210 and A220. The first logical area A210 may be a user area generally being used by a user and the second logical area A220 may be a pre-boot area (or an sMBR; shadow master boot record area) including information (for example, a shadow master boot record, a pre-operating system) for performing a pre-boot authentication. The first logical area A210 may include a master boot record (MBR) and the second logical area may include a shadow master boot record (sMBR).

In a booting operation (or link-up), to recognize the nonvolatile memory system 1100, the host 1010 may perform a read operation by transmitting a start logical block address LBA0 (or a 0th logical block address) to the nonvolatile memory system 1100.

In the case before a pre-boot authentication is performed, the memory controller 1100 may redirect the start logical block address LBA0 to a logical page number LPN of the second logical area A220 so that the host 1010 recognizes the second logical area A220. A physical storage area corresponding to the logical page number LPN of the redirected second logical area A220 may include a shadow master boot record. That is, the host 1010 reads the shadow master boot record sMBR to recognize the second logical area A220 as a host view A100. The host view A100 indicates a storage area of the nonvolatile memory system 1100 being recognized by the host 1010.

The redirection (or redirect) indicates an operation of translating a logical block address LBA received from the host 1010 into a logical page number LPN being managed by the memory controller 1110.

In the case when a pre-boot authentication is completed, the memory controller 1110 may redirect the start logical block address LBA0 to a logical page number LPN of the first logical area A210 so that the host 1010 recognizes the first logical area A210. A physical storage area corresponding to the logical page number PN of the redirected first logical area A210 may include a master boot record. That is, the host 1010 reads the master boot record MBR to recognize the first logical area A210 as the host view A100.

The memory controller 1110 may read data stored in the nonvolatile memory device 1120 or store data in the nonvolatile memory device 1120 on the basis of the translated logical page number LPN.

According to exemplary embodiments, the user system 1000 may update the second logical area A220 (that is, the pre-boot area or the shadow master boot record area). For example, the host 1010 may allocate a part of the first logical area A210 being managed by the memory controller 1100 as an update area for updating the second logical area A220 and transmit a write command and the updated data to the nonvolatile memory system 1100 so that the updated data is written in the allocated update area.

After that, in the case when a write command with respect to the update area allocated by the host 1010 is received to the memory controller 1100, the memory controller 1100 may redirect a logical block address so that the updated data is written in the second logical area A220 instead of writing the updated data in the allocated update area. The update method of the user system 1000 for updating the second logical area A220 will be described in more detail with reference to FIGS. 5 through 7.

Figure 2:
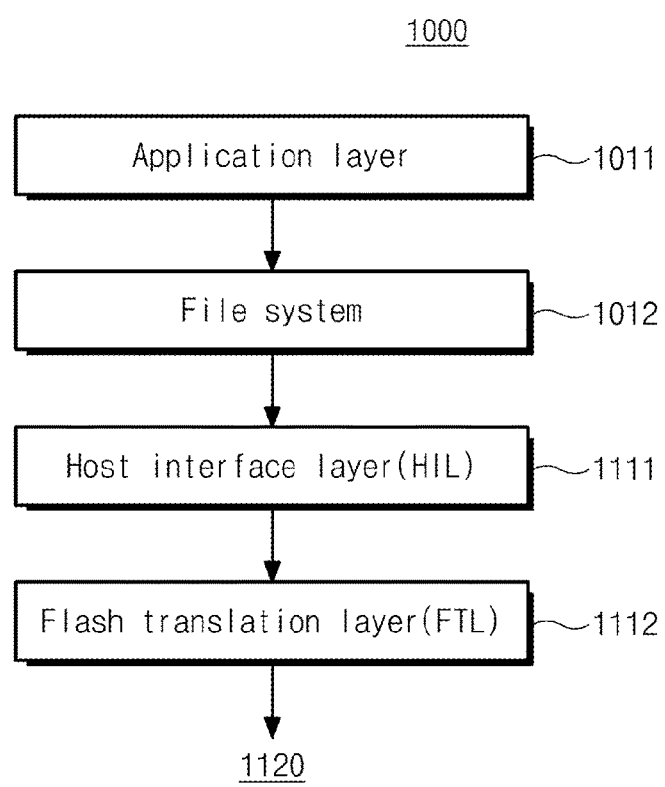
FIG. 2 is a block diagram illustrating a software layer of a user system of FIG. 1.

FIG. 2 is a block diagram illustrating a software layer of a user system of FIG. 1. Referring to FIGS. 1 and 2, a software layer of the user system 1000 may include an application layer 1011, a file system 1012, a host interface layer 1111 and a flash translation layer 1120.

The application layer 1011 may include various application programs being driven in the user system 1000. For example, the application layer 1011 may include a text editor, a web browser, a video player, a game program, etc. The application layer 1011 may include a vendor program of managing or executing an update of the second area A220. In exemplary embodiments, the vendor program of managing or executing an update of the second area A220 is actually stored in the physical area A300 corresponding to the first logical area A210.

The file system 1012 performs a function of organizing or managing a file or data being used by the application layer 1011, and a storage area being recognized from the nonvolatile memory system 1100. For example, the file system 1012 may provide a logical block address LBA of a file or data to the nonvolatile memory system 1100. The file system 1012 may have a different form depending on an operating system OS of the host 1010. In exemplary embodiments, the file system 1012 may include a file allocation table (FAT), FAT32, NT file system (NTFS), hierarchical file system (HFS), journaled file system2 (JSF2), XFS, on-disk structure-5 (ODS-5), UDF, ZFS, unix file system (UFS), ext2, ext3, ext4, ReiserFS, Reiser4, ISO, 9660, Gnome VFS, BFS, or WinFS, etc.

The file system 1012 may define data by a sector unit. The file system 1012 may manage data on the basis of the logical block address LBA. The file system 1012 may be driven by the host 1010. In exemplary embodiments, the application layer 1011 and the file system 1012 may be included in the host 1010.

The host interface layer 111 (hereinafter it is referred to as 'HIL') performs a function of translating signals or information received from the host 1010 into signals or information that can be used in the nonvolatile memory system 1100. For example, the HIL 111 may translate (or redirect) a logical block address LBA received from the host 1010 into a logical page number LPN. That is, an area of the nonvolatile memory system 1100 being recognized as the host view A100 in the host 1010 may be different depending on whether a pre-boot authentication is performed.

In exemplary embodiments, the host interface layer 111 may include various interface protocols such as a universal serial bus (USB) protocol, a multimedia card (MMC) protocol, an embedded MMC protocol, a peripheral component interconnection (PCI) protocol, a PCI-express protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, a mobile industry processor interface (MIPI) protocol, a universal flash storage (UFS) protocol, a nonvolatile memory express (NVMe) protocol, a WIFI protocol, a Bluetooth protocol, etc.

The flash translation layer 1112 (hereinafter it is referred to as 'FTL') may map a logical page number LPN and a physical page number PPN with each other so that the nonvolatile memory device 1120 is efficiently used. For example, the nonvolatile memory device 1120 reads or writes data by a page unit and erases data by a block unit. Since the nonvolatile memory device 1120 does not support an overwrite operation, to efficiently manage the nonvolatile memory device 1120, an address translation operation is required which translates a logical page number LPN translated by the HIL 1111 into a physical page number PPN of the nonvolatile memory device 1120. The FTL 1112 manages the address translation operation described above through a mapping table. The FTL 112 may perform an operation such as a junk collection, a wear-leveling, etc. for efficiently managing the nonvolatile memory device 1120.

A logical area being organized in the file system 1012 may be changed by the address translation operation (that is, a redirection operation) of the HIL 1111. The host 1010 may recognize a logical area organized by the file system 1012 as the host view A100.

Figure 3:
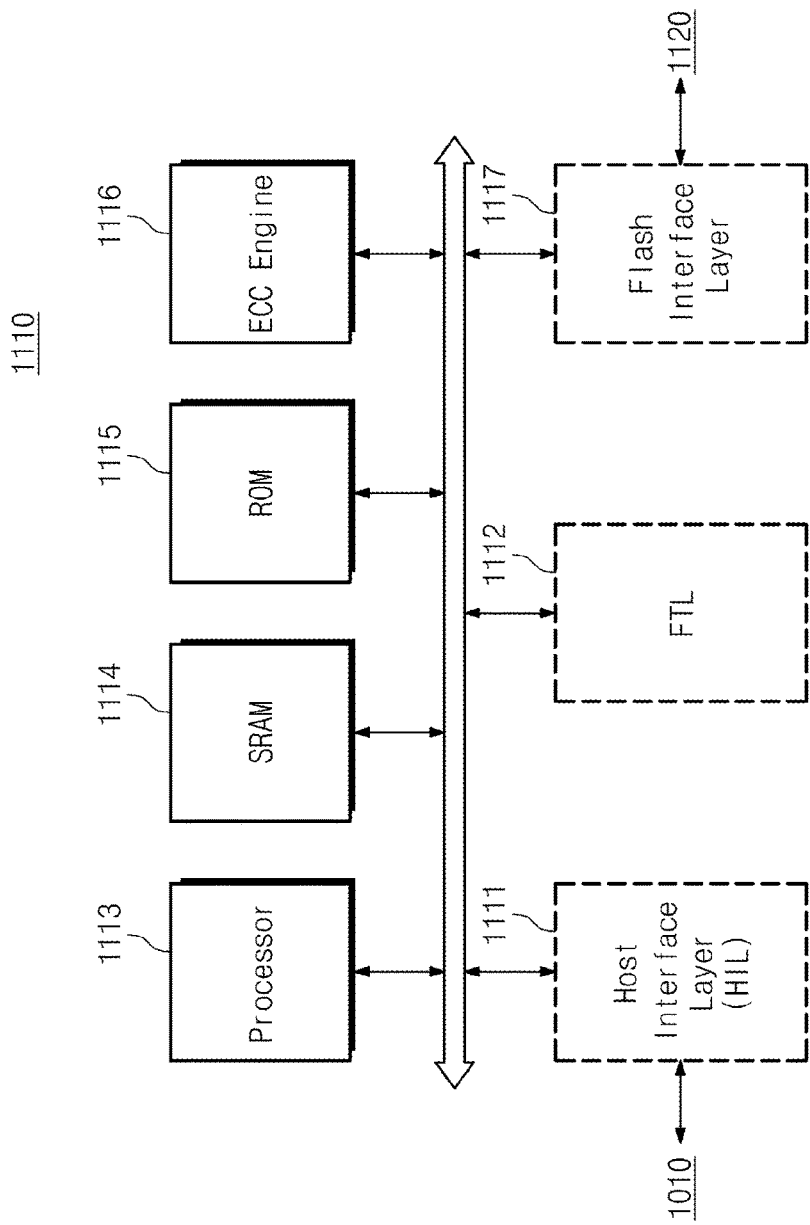
FIG. 3 is a block diagram illustrating a memory controller of FIG. 1.

FIG. 3 is a block diagram illustrating a memory controller of FIG. 1. Referring to FIGS. 1 through 3, the memory controller 1110 may include the host interface layer HIL 1111, the flash translation layer FTL 1112, a processor 1113, a SRAM 1114, a ROM 1115, an error correction code engine 1116 and the flash interface layer 1117. Since the HIL 1111 and the FTL 1112 were described with reference to FIG. 2, a detailed description thereof is omitted.

The processor 1113 may control an overall operation of the memory controller 1110. The HIL 1111 and the FTL 1112 are stored in the SRAM 1114 in a software form and may be driven by the processor 1113. Alternatively, the HIL 1111 may be provided as a hardware form.

The SRAM 1114 may be used as a buffer memory, a cache memory, an operation memory, etc. of the memory controller 1110. The ROM 1115 may store information being required when the memory controller 1110 operates or is booted in a firmware form. The error correction code engine 1116 may generate an error correction code with respect to data to be stored in the nonvolatile memory device 1120 or detect and correct an error of data read from the nonvolatile memory device 1120. The memory controller 1110 may communicate with the nonvolatile memory device 1120 through the flash interface layer 1117. The flash interface layer 1117 may include a NAND interface.

Figure 4:
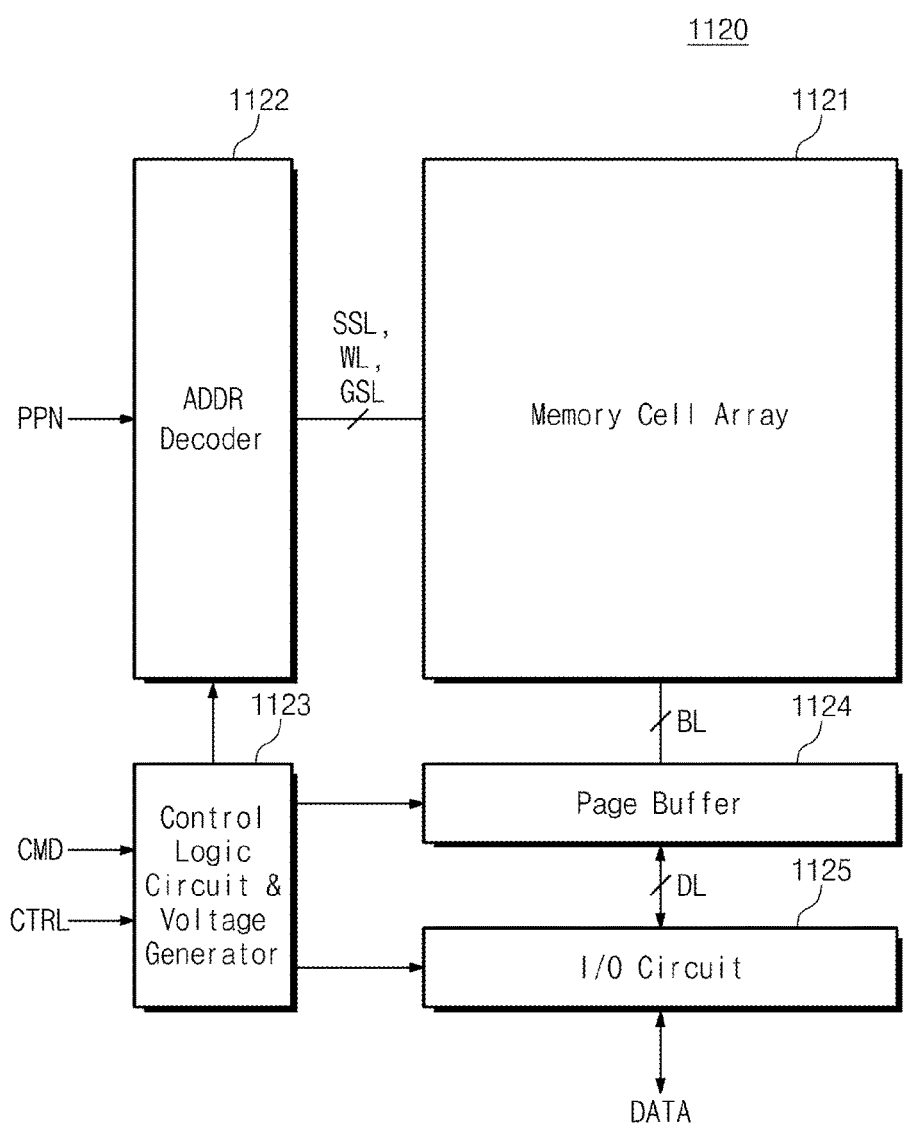
FIG. 4 is a block diagram illustrating a nonvolatile memory device of FIG. 1.

FIG. 4 is a block diagram illustrating a nonvolatile memory device of FIG. 1. Referring to FIGS. 1 and 4, the nonvolatile memory device 1120 may include a memory cell array 1121, an address decoder 1122, a control logic circuit & voltage generator 1123, a page buffer 1124 and an input/output circuit 1125.

The memory cell array 1121 includes a plurality of memory blocks. Each memory block includes a plurality of cell strings. Each cell string is connected to a bit line BL and includes a plurality of memory cells. Each memory cell is connected to a word line WL. Each memory cell may include a single-level cell (SLC) storing 1-bit or a multi-level cell (MLC) storing at least 2-bits. In exemplary embodiments, each memory block may have a three-dimensional structure.

The address decoder 1122 is connected to the memory cell array 1121 through string selection lines SSL, word lines WL, and ground selection lines GSL. A physical page number PPN (or a physical address including the physical page number PPN) may be received from the memory controller 1110. The address decoder 1122 may decode the received physical page number PPN to select at least one of word lines WL and drive the at least one selected word line.

The control logic circuit & voltage generator 1123 may receive a command CMD and a control signal CTRL from the memory controller 1110 and control the address decoder 1122, the page buffer 1124, and input/output circuit 1125 in response to the received command CMD and the control signal CTRL.

The control logic circuit & voltage generator 1123 may generate various voltages required in an operation of the nonvolatile memory device 1120. For example, the control logic circuit & voltage generator 1123 may generate various voltages such as a plurality of selection read voltages, a plurality of program voltages, a plurality of non-selection read voltages, a plurality of pass voltages, a plurality of erase voltages, etc.

The page buffer 1124 is connected to the memory cell array 1121 through bit lines BL. The page buffer 1124 may control the bit line BL so that data is written in the memory cell array 1121 under a control of the control logic circuit & voltage generator 1123. The page buffer 1124 may control the bit line BL so that data stored in the memory cell array 1121 is read under a control of the control logic circuit & voltage generator 1123.

The input/output circuit 1125 may receive data DATA from the memory controller 1110 to transmit the received data to the page buffer 1124. The input/output circuit 1125 may receive read data from the page buffer 1124 to transmit the received read data to the memory controller 1110. The input/output circuit 1125 may include a global buffer.

Figure 5:
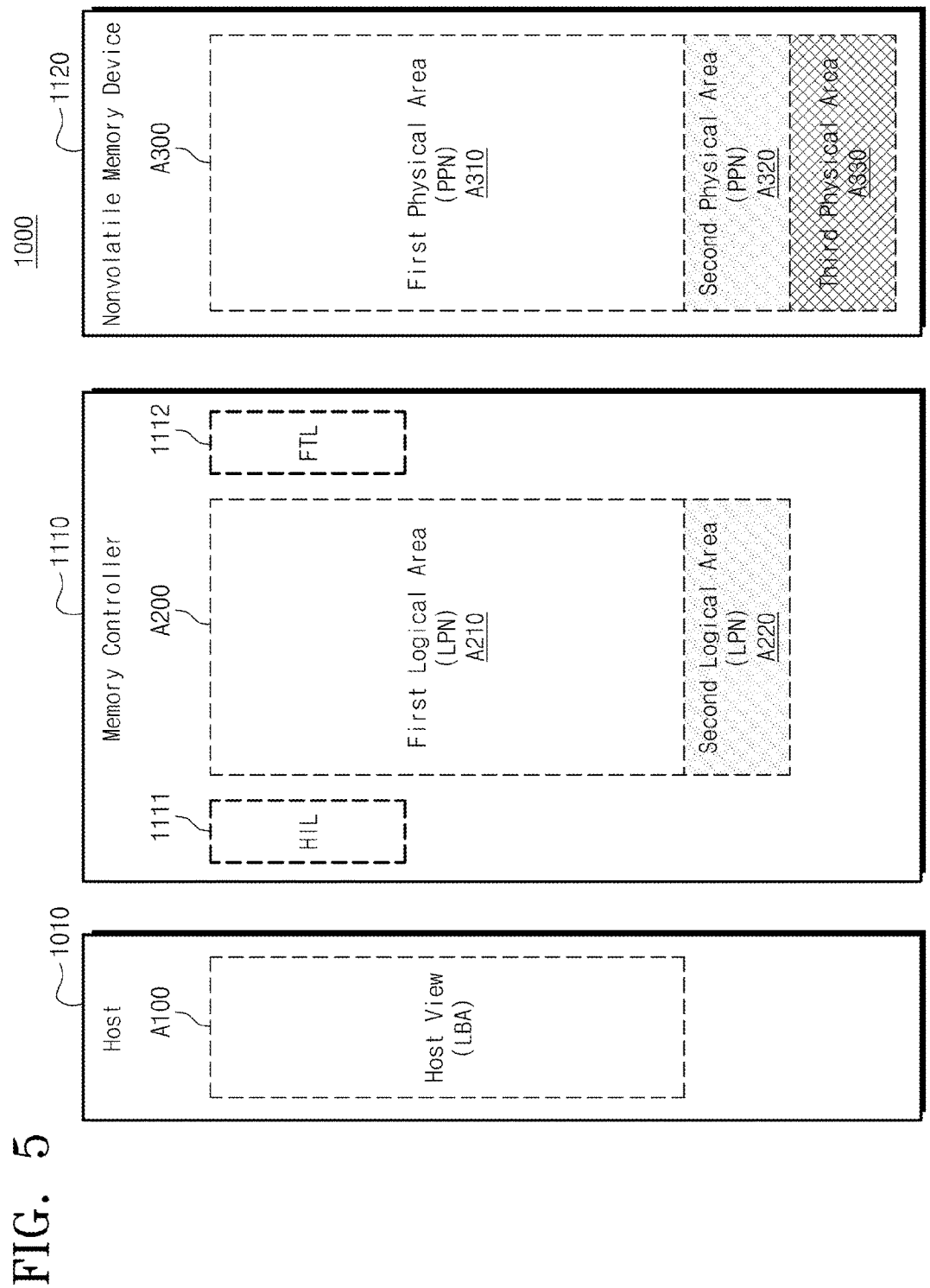
FIG. 5 is a block diagram for explaining logical areas and physical areas of the user system of FIG. 1.
Figure 6:
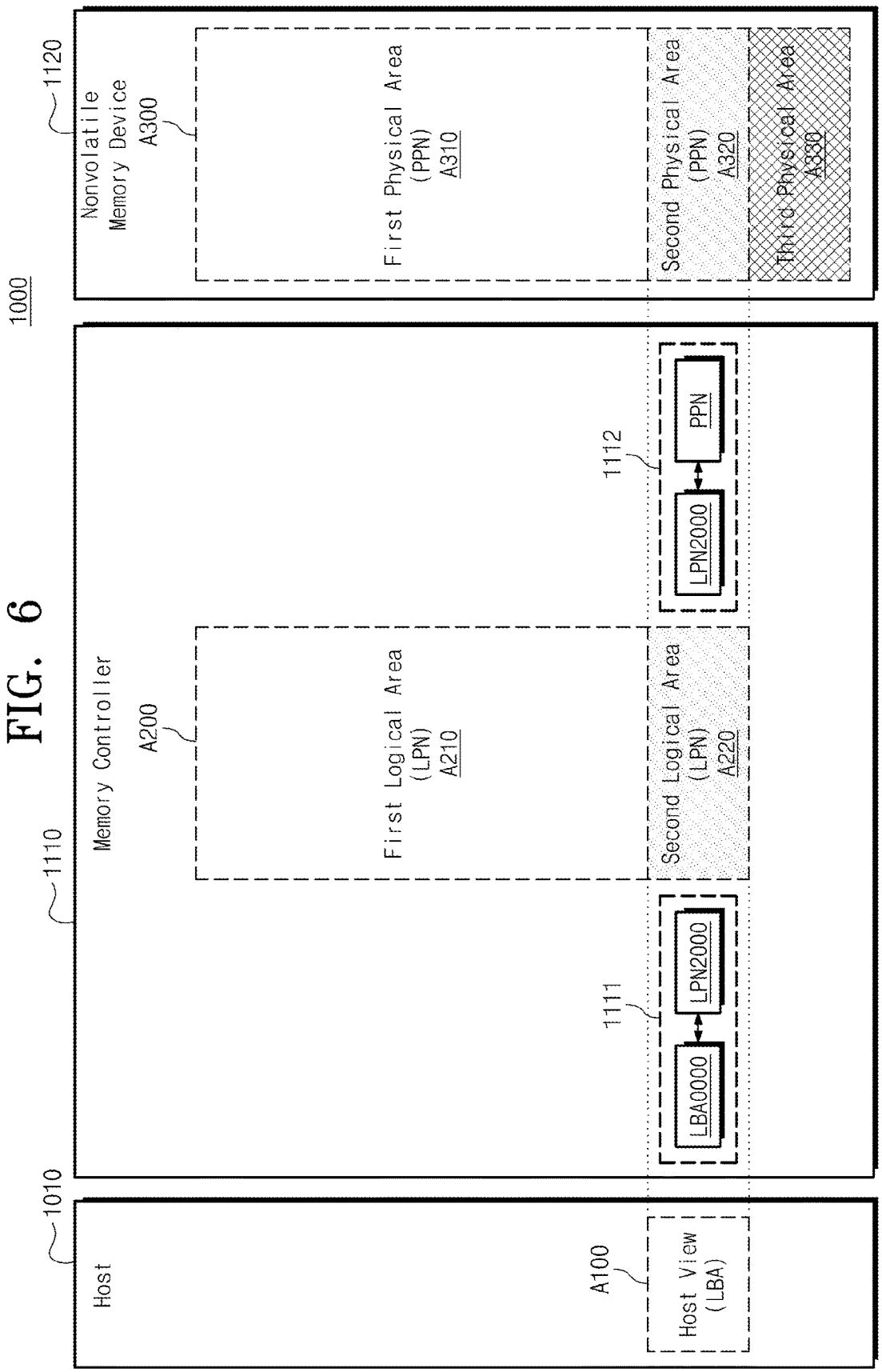
FIGS. 6 and 7 are block diagrams for explaining a pre-boot authentication operation.
Figure 7:
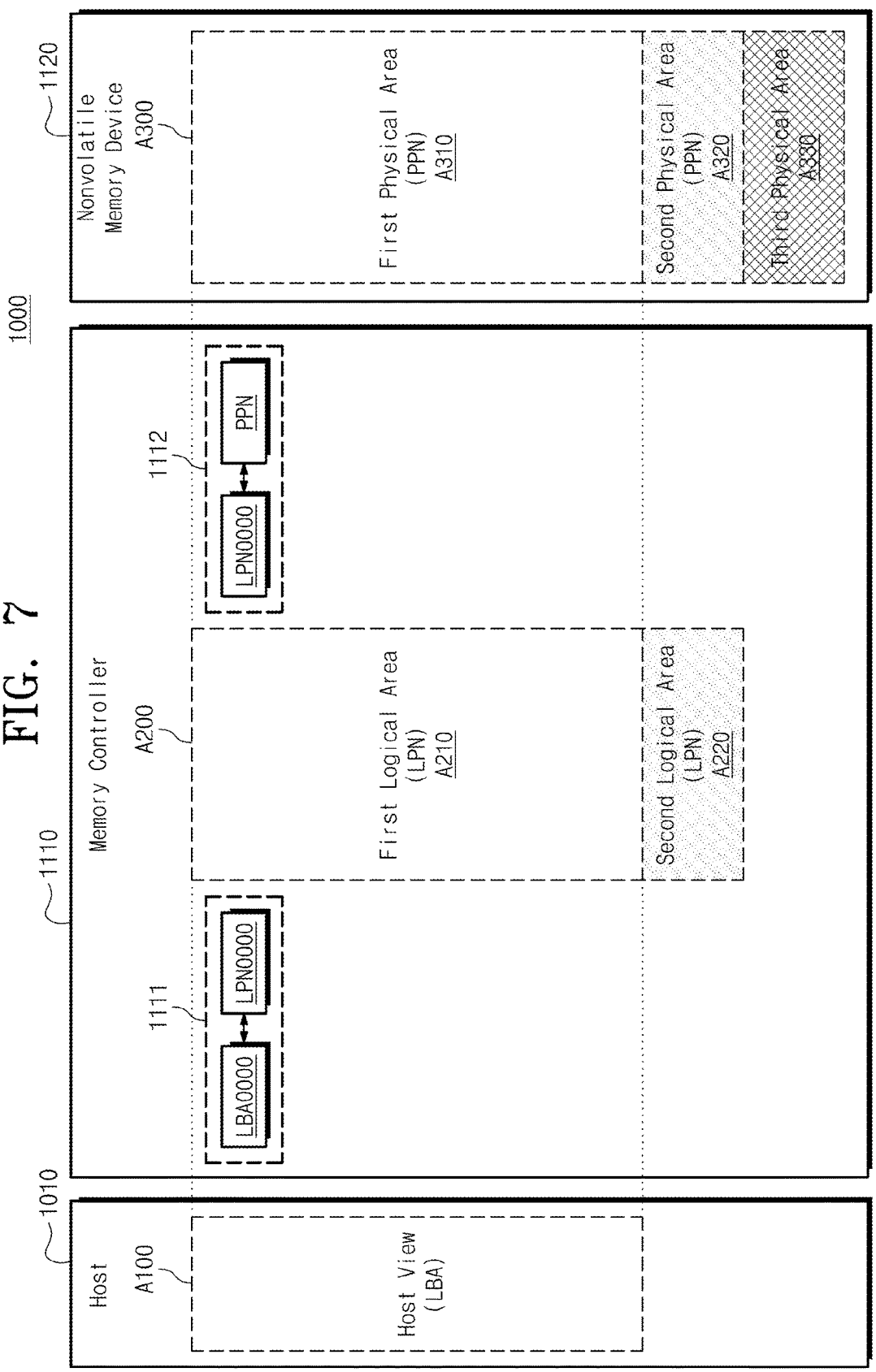

FIG. 5 is a block diagram for explaining logical areas and physical areas of the user system of FIG. 1. FIGS. 6 and 7 are block diagrams for explaining a pre-boot authentication operation. For brevity of description, it is assumed that the host view A100 is a logical area (that is, a storage area of the nonvolatile memory system 1100 viewed from the host 1010) of the nonvolatile memory system 1100 being recognized by the host 1010 and is organized based on a logical block address LBA.

It is assumed that the logical storage area A200 includes the first logical area A210 and the second logical area A220. The first and second logical areas A210 and A220 are logical areas defined by the memory controller 1100, are managed by the logical page number LPN and include logical page numbers LPN0000~LPN1999 and logical page numbers LPN2000~LPN2099 respectively.

It is assumed that the first logical area A210 is a user area in which data is written or read by a user and the second logical area A220 is a pre-boot area (or a shadow master boot record area) for a pre-boot authentication. It is assumed that the physical storage area A300 includes first through third physical areas A310, A320 and A330 and each of the first through third physical areas A310, A320 and A330 includes a physical page included in the nonvolatile memory device 1120 and is managed by the physical page number PPN.

Reference numbers and terms being used in the inventive concept are defined as described above for brevity of description but the inventive concept is not limited thereto and may be variously changed within a technical spirit of the inventive concept.

Referring to FIG. 5, the host 1010 may recognize a storage area of the nonvolatile memory system 1100 as the host view A100. For example, the memory controller 1100 may manage the logical storage area A200 on the basis of the logical page number LPN. The logical storage area A200 includes the first logical area A210 and the second logical area A220. The HIL 111 of the memory controller 1100 may redirect a logical block address LBA to a logical page number LPN so that any one of the first and second logical areas A210 and A220 is recognized as the host view A100 by the host 1010. The first logical area A210 indicates a user area in which data is stored and read by a user and the second logical area A220 indicates an area for a pre-boot authentication. The first logical area A210 may include a master boot record MBR and the second logical area A220 may include a shadow master boot record sMBR.

The nonvolatile memory device 1120 includes a physical storage area A300. The physical storage area A300 indicates a physical storage area in which data is actually stored. The physical storage area A300 includes first through third physical areas A310, A320 and A330. The first physical area A310 is mapped with the first logical area A210 by the FTL 1112. The second physical area A320 is mapped with the second logical area A220 by the FTL 1112. The third physical area A330 may include memory blocks replacing a bad block when the bad block occurs in the first or second physical areas A310 or A320. The third physical area A330 may include free blocks.

Referring to FIG. 6, when the host 1010 is booted (or is linked up with the nonvolatile memory system 1100), the host 1010 may perform a read operation with respect to a start logical block address LBA0000. A storage area corresponding to the start logical block address LBA0000 may include the master boot record MBR or the shadow master boot record sMBR. The host 1010 may recognize a part of storage area of the nonvolatile memory system 1100 as the host view A100 by reading the master boot record MBR or the shadow master boot record sMBR.

The HIL 1111 of the memory controller 1100 may redirect the start logical block address LBA0000 received from the host 1010 to a logical page number LPN. At this time, in the case when the host 1010 is not certified by a pre-boot authentication, the memory controller 1100 may redirect the received start logical block address LBA0000 to a start logical page number LPN2000 of the second logical area A220 so that the host 1010 recognizes the second logical area A220 as the host view A100.

A shadow master boot record sMBR may exist in a physical area corresponding to the start logical page number LPN2000 of the second logical area A220. The shadow master boot record sMBR may include information of size, type, state, etc. of the second logical area A220. The shadow master boot record sMBR may be defined by the host 1010. The host 1010 may read the shadow master boot record sMBR to recognize the second logical area A220 as the host view A100. Firmware being driven by a processor (not shown) of the host 1010 may read and execute the shadow master boot record sMBR.

The FTL 1112 of the memory controller 1110 manages physical page numbers PPN of the second physical area A320 corresponding to the logical page numbers LPN2000~LPN2099 of the second logical area A220.

The host 1010 recognizes the second logical area A220 as the host view A100 and data stored in the second physical area A320 is loaded. That is, before the host 1010 performs a pre-boot authentication, since only the second logical area A220 is recognized and the first logical area A210 is not recognized, the host 1010 cannot recognize the first logical area A210 or cannot access the first physical area A310.

Referring to FIG. 7, in the case that a pre-boot authentication is completed, the host 1010 may perform a read operation with respect to the start logical block address LBA0000. When a pre-boot authentication is completed, the memory controller 1100 may link-up with the host 1010 again. That is, in the case when a pre-boot authentication is completed, the memory controller 1010 finishes a connection with the host 1010 and retries a connection with the host 1010. At this time, the host 1010 may perform a read operation with respect to the start logical block address LBA0000.

Since a pre-boot authentication is completed, the memory controller 1110 redirects the received start logical block address LBA0000 to the start logical page numbers LPN0000 of the first logical area A210.

In this case, the host 1010 recognizes the first logical area A210 as the host view A100. For example, a storage area corresponding to the start logical page numbers LPN0000 of the first logical area A210 may include a master boot record MBR (not shown). The master boot record MBR may include information of size, type, state, etc. of the first logical area A210. The master boot record MBR may be defined by the file system 1012 of the host 1010. The start logical block address LBA0000 is redirected to the start logical page numbers LPN0000 of the first logical area A210 and thereby the host 1010 can read a master boot record MBR and recognize the first logical area A210 as the host view A100.

The FTL 1112 may manage mapping information of the logical page numbers LPN0000~LPN1999 of the first logical area A210 and physical page numbers PPN of the first physical area A310.

The logical block addresses LBA and the logical page numbers LPN being managed by the HIL 1111 may sequentially increase. However, the physical page numbers PPN being managed by the FTL 1112 may be non-sequential with respect to the logical page numbers LPN.

Figure 8:
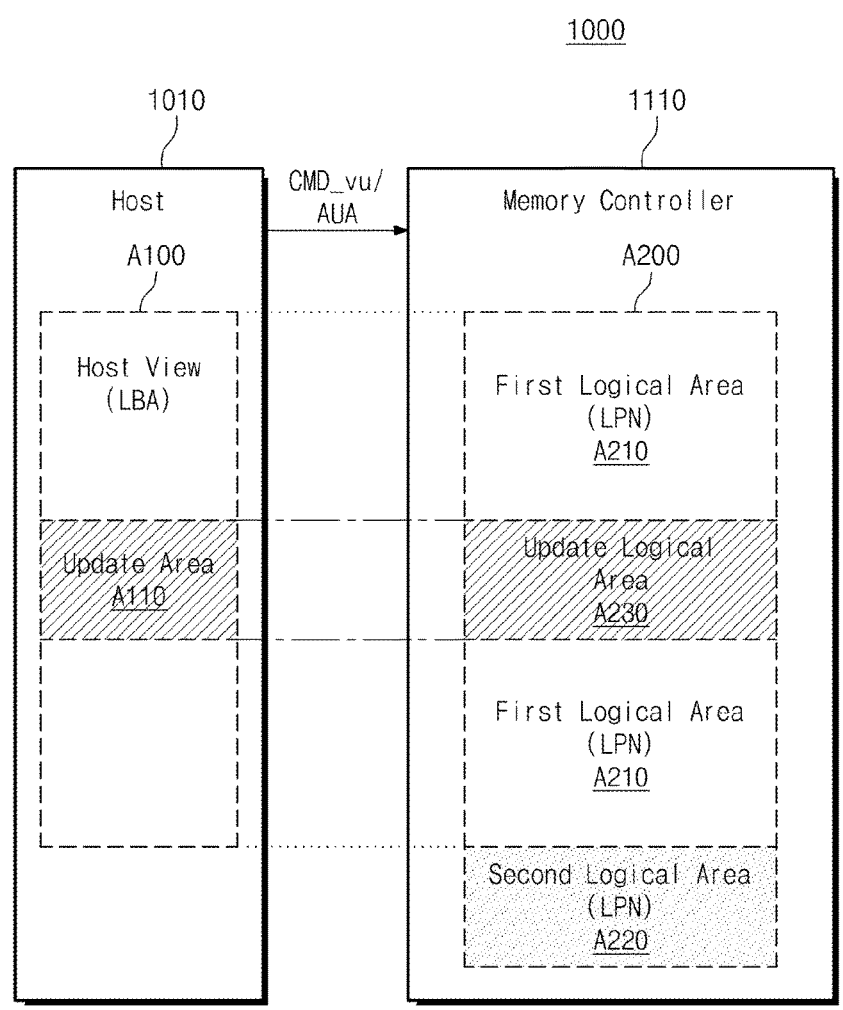
FIGS. 8 through 10 are block diagrams for explaining an update method with respect to a second logical area.
Figure 9:
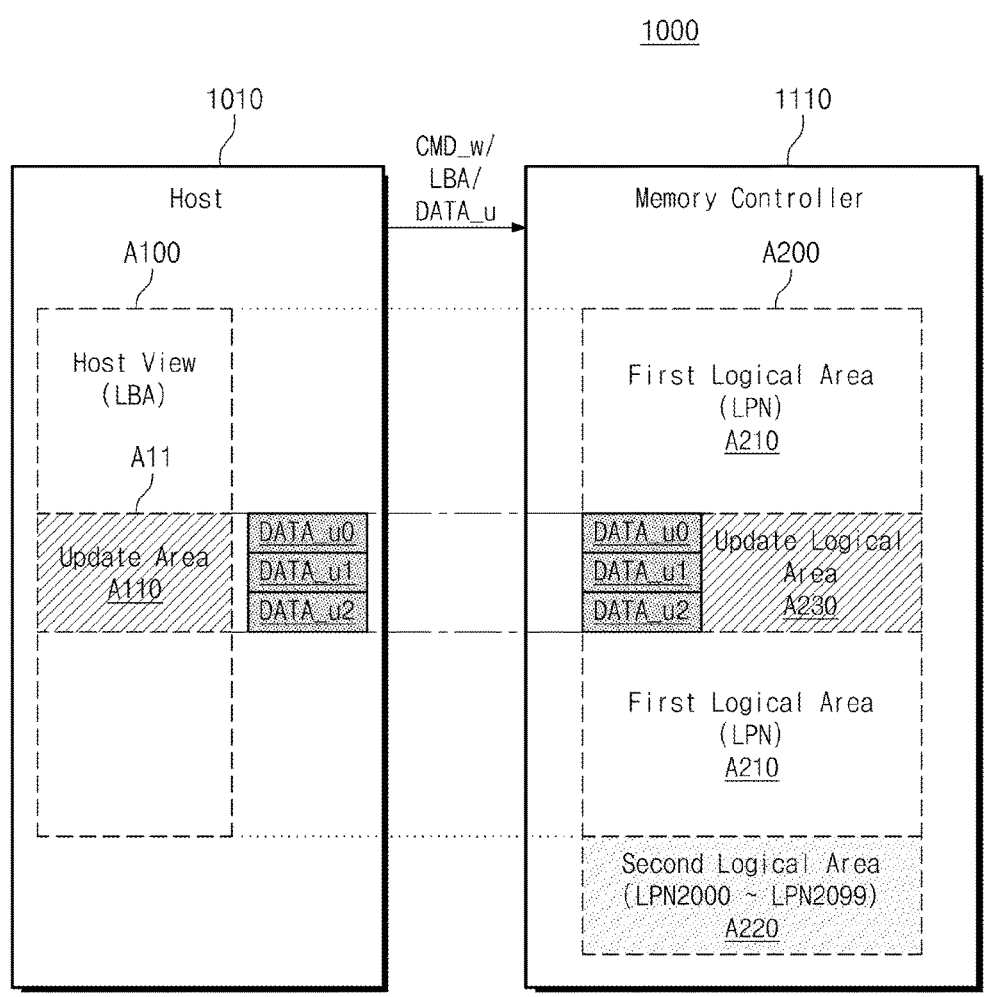
Figure 10:
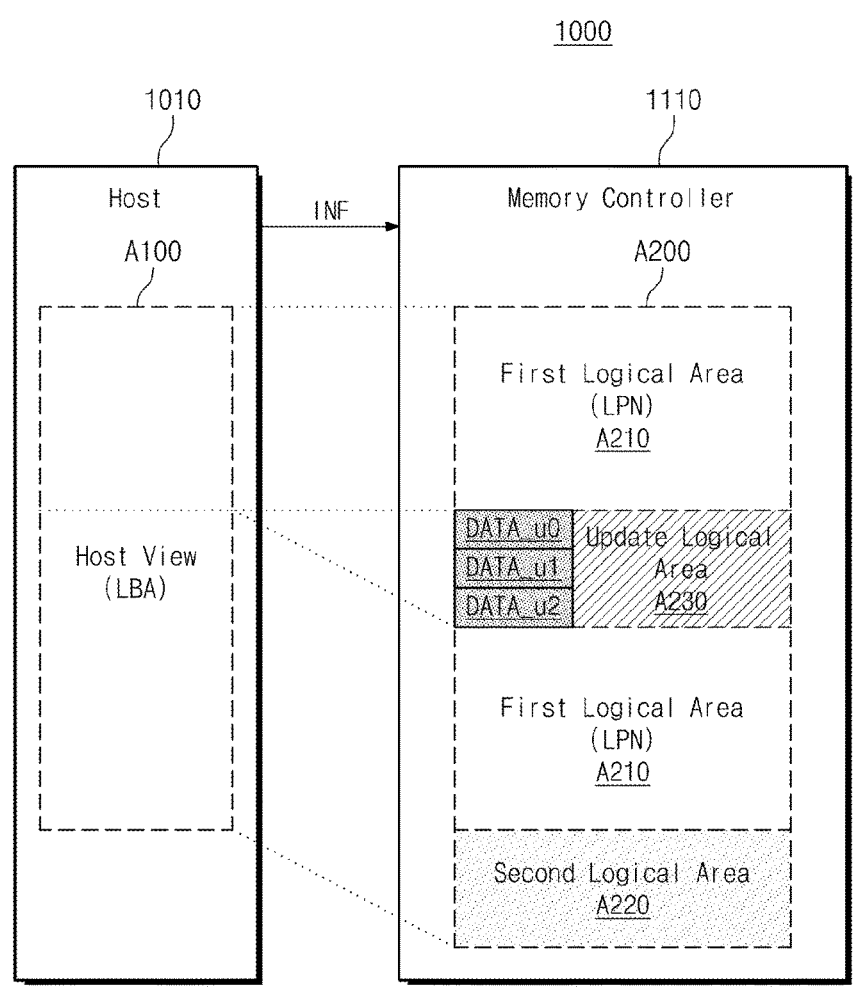

FIGS. 8 through 10 are block diagrams for explaining an update method with respect to a second logical area. For brevity of description and drawings, constituent elements which are not necessary for describing an update method with respect to the second logical area A220 are omitted.

For brevity of description, an operation of the user system 1000 is explained with reference to the host view A100 and the logical area A200 but the inventive concept is not limited thereto. For example, storing data in the logical storage area A200, the first logical area A210 or the second logical area A220 means that data is stored in the physical storage area A300 corresponding to the logical storage area A200, the first logical area A210 or the second logical area A220. The physical storage area A300 corresponding to the logical storage area A200, the first logical area A210 or the second logical area A220 is managed by the FTL 1112.

Referring to FIG. 8, the host 1010 may allocate some areas of the host view A100 to an update area A110 to update the second logical area A220. When the host 1010 recognizes the first logical area A210 as the host view A100, the update area A110 may be allocated. An operation of allocating the update area A110 may be performed in the application layer 1011 (refer to FIG. 2) such as a vendor program, a user program, etc., or the file system 1012 (refer to FIG. 2).

The host 1010 may transmit information AUA of the allocated update area A110 and a command CMD_vu to the memory controller 1110. The information AUA of the allocated update area A110 may include a logical block address and a logical block address length of the allocated update area A110, or a logical block address range. The command CMD_vu may be a reserved command defined by the HIL 1111, combinations of commands defined by the HIL 1111, a specific command not defined by the HIL 1111, or a vendor command. The command CMD_vu may be a command for notifying the information AUA of the allocated update area A110 to the memory controller 1110.

The memory controller 1110 may set an area corresponding to the information AUA of the received update area A110 as an update logical area A230. The memory controller 1110 may store information of the update logical area A230 corresponding to the information AUA of the update area A110 in the SRAM 1114 to manage it.

Referring to FIG. 9, the host 1010 may transmit a write command CMD_w, a logical block address LBA and update data DATA_u0~DATA_u2 to the memory controller 1110 so that the update data DATA_u0~DATA_u2 are written in the update area A110. The logical block address LBA being transmitted may be an address included in the update area A110.

The memory controller 1110 may store the received update data DATA_u0~DATA_u2 in an area (that is, the update logical area A230) corresponding to the received logical block address LBA. The update data DATA_u0~DATA_u2 stored in the update logical area A230 may actually be stored in a physical area corresponding to the update logical area A230 among the first physical area A310 (refer to FIG. 5). The physical area corresponding to the update logical area A230 may be managed based on an address translation operation of the FTL 1112.

Referring to FIG. 10, after the update data DATA_u0~DATA_u2 are all written, the host 1010 may transmit update completion information INF to the memory controller 1110. The memory controller 1110 may return the second logical area A220 to a user area in response to the update completion information INF. That is, the memory controller 1110 returns the second logical area A220 to the user area and thereby the host 1010 can recognize the first logical area A210 and the second logical area A220 as the host view A100.

After that, in the case when a pre-boot authentication is required, the memory controller 1110 can perform a redirection operation so that the host 1010 recognizes the update logical area A230.

As described above, the host 1010 allocates a part of the host view A100 to the update area A110. In the case when the update area A110 has a discontinuous logical block address LBA (that is, the update area A110 is fragmented), the update logical area A230 also has a discontinuous logical page number LPN. Because of this, after an update operation is completed, there is a problem that a separate management for the update logical area A230 is required.

Figure 11:
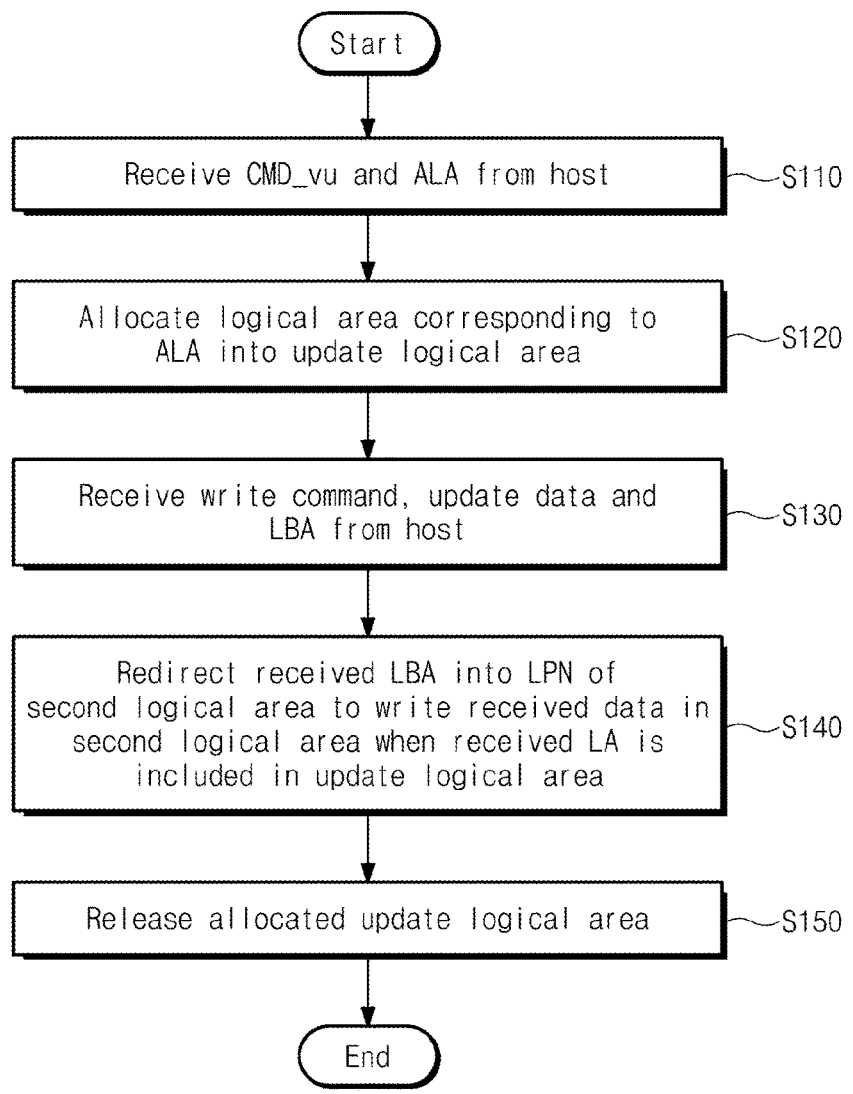
FIG. 11 is a flowchart illustrating an operation of a memory controller in accordance with an embodiment of the inventive concept.
Figure 12:
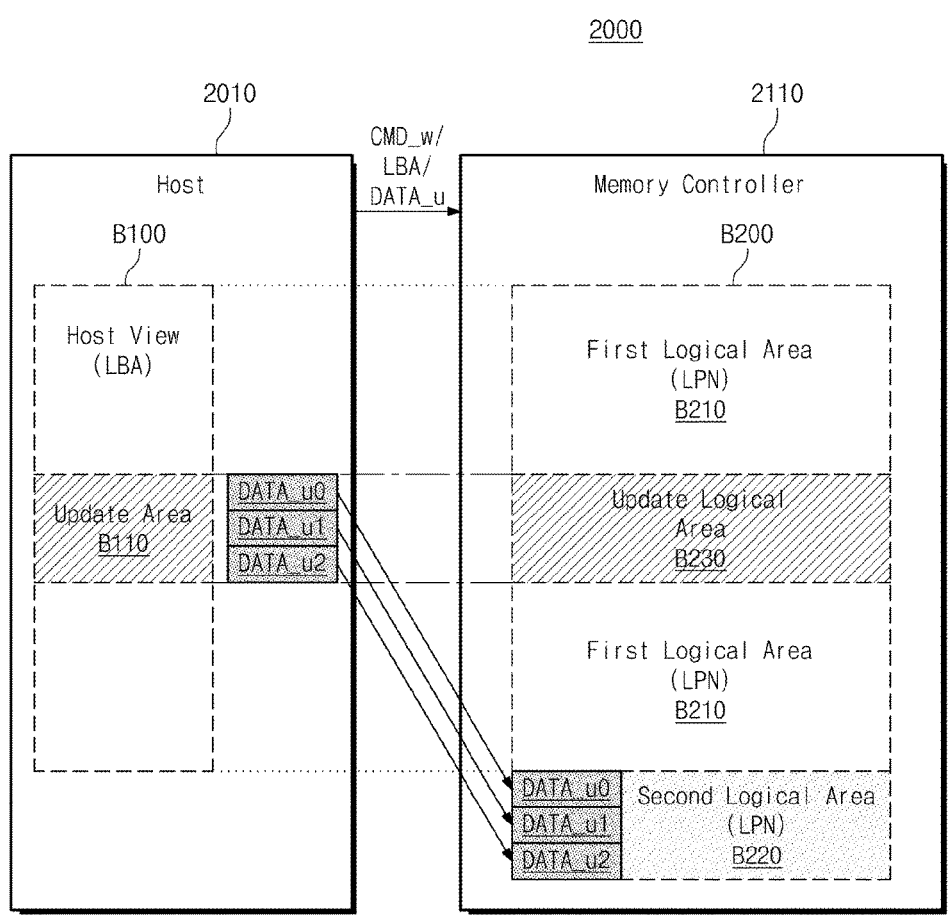
FIG. 12 illustrates block diagrams for explaining a step S140 of FIG. 11.

FIG. 11 is a flowchart illustrating an operation of a memory controller in accordance with an embodiment of the inventive concept. FIG. 12 illustrates block diagrams for explaining a step S140 of FIG. 11. For brevity of description, because operations of steps S110~S130 were described with reference to FIG. 8, a description thereof will be omitted. Referring to FIGS. 11 and 12, in a step S110, a memory controller 2110 may receive information ALA of an update area B110 and a command CMD_vu from a host 2010. Since the information ALA of the update area B110 and a command CMD_vu were described with reference to FIG. 8, a description thereof is omitted.

In a step S120, the memory controller 2110 may allocate a logical area corresponding to the information ALA of the received update area B110 to the update logical area A230.

In a step S130, the memory controller 2110 may receive a write command CMD_w, update data DATA_u, and a logical block address LBA from the host 2010. The logical block address LBA being received in the step S130 may be a logical block address LBA included in the information ALA of the update area B110.

In a step S140, the memory controller 2110 may redirect the received logical block address LBA to a logical page number LPN of a second logical area B220 so that the received update data DATA_u is written in the second logical area B220.

For example, in the update methods described with reference to FIGS. 8 through 10, update data is written in an area (i.e., an update logical area) corresponding to the received logical block address, but the memory controller 2110 according to an operation of FIG. 11 writes update data in the second logical area B220 (i.e., a logical storage area not recognized by the host 2010).

The logical block address LBA may be included in the information ALA of the update area B110. In a general case, the update data DATA_u0 may be written in the update logical area A230.

However, in the case that the memory controller 2110 performs an update operation of the second logical area B220, the memory controller 2110 redirects logical block addresses LBA included in the information ALA of the update area B110 to logical page numbers LPN of the second logical area B220. That is, the received logical block addresses LBA are redirected to the logical page numbers LPN of the second logical area B220 and thereby the update data DATA_u0~DATA_u2 are written in the second logical area B220.

In a step S150, after an update operation is completed, the memory controller 2110 may release an update logical area B230. For example, the memory controller 2110 may translate or return the update logical area B230 into a first logical area B210 under the control of the host 2010. The release operation of the step S150 may be performed in an application or file system of the host 2010.

Figure 13:
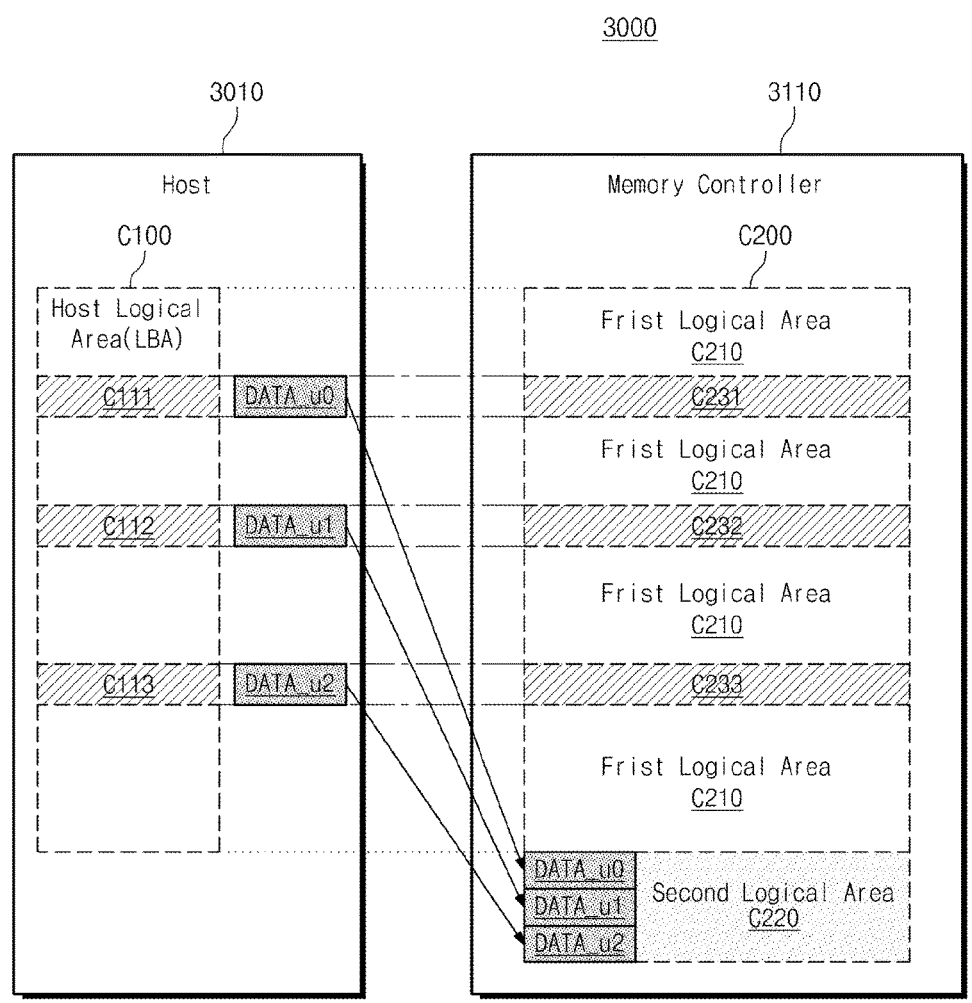
FIG. 13 is a block diagram for explaining another example of the step S140 of FIG. 11.

FIG. 13 illustrates block diagrams for explaining another example of the step S140 of FIG. 11. Referring to FIG. 13, update areas C111, C112 and C113 allocated by a host 3010 may have discontinuous logical block address. That is, the allocated update area may be fragmented.

In this case, the host 3010 may transmit information of the update areas C111, C112 and C113 to the memory controller 3110. The memory controller 3110 may allocate logical areas corresponding to the update areas C111, C112 and C113 to update logical areas C231, C232 and C233 on the basis of the received information.

After that, update data DATA_u0~DATA_u2 may be written in a second logical area C220 on the basis of the same method as that described with reference to FIG. 12.

As described above, in the case of updating the second logical area C220, the memory controller 3110 may redirect a logical block address to a logical page number LPN of the second logical area C220 so that update data is written in the second logical area C220 instead of writing the update data in the allocated update logical areas C231, C232, and C233. Accordingly, even if the allocated update area has a discontinuous logical block address, an update operation with respect to the second logical area C220 can be more stably and effectively performed. Thus, a user system having improved performance and reliability is provided.

Figure 14:
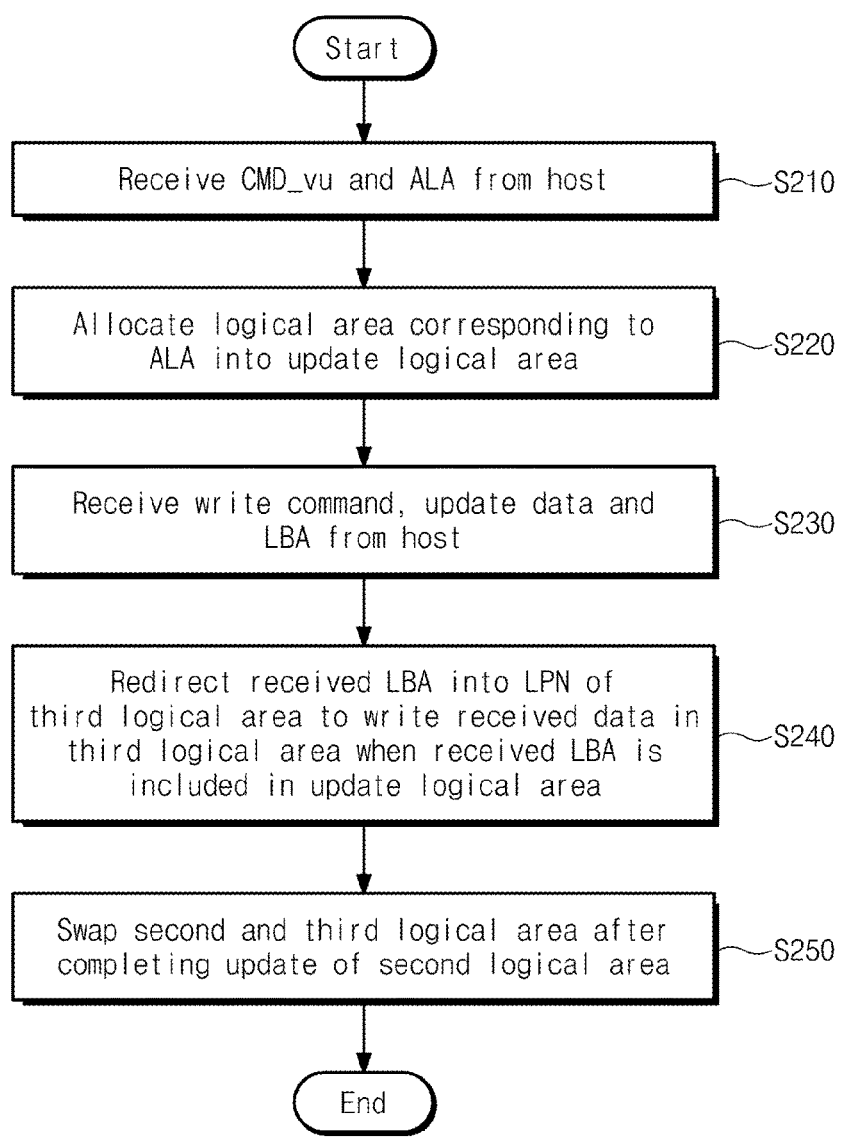
FIGS. 14 through 16 are a flowchart and block diagrams illustrating an operation of a memory controller in accordance with another embodiment of the inventive concept.
Figure 15:
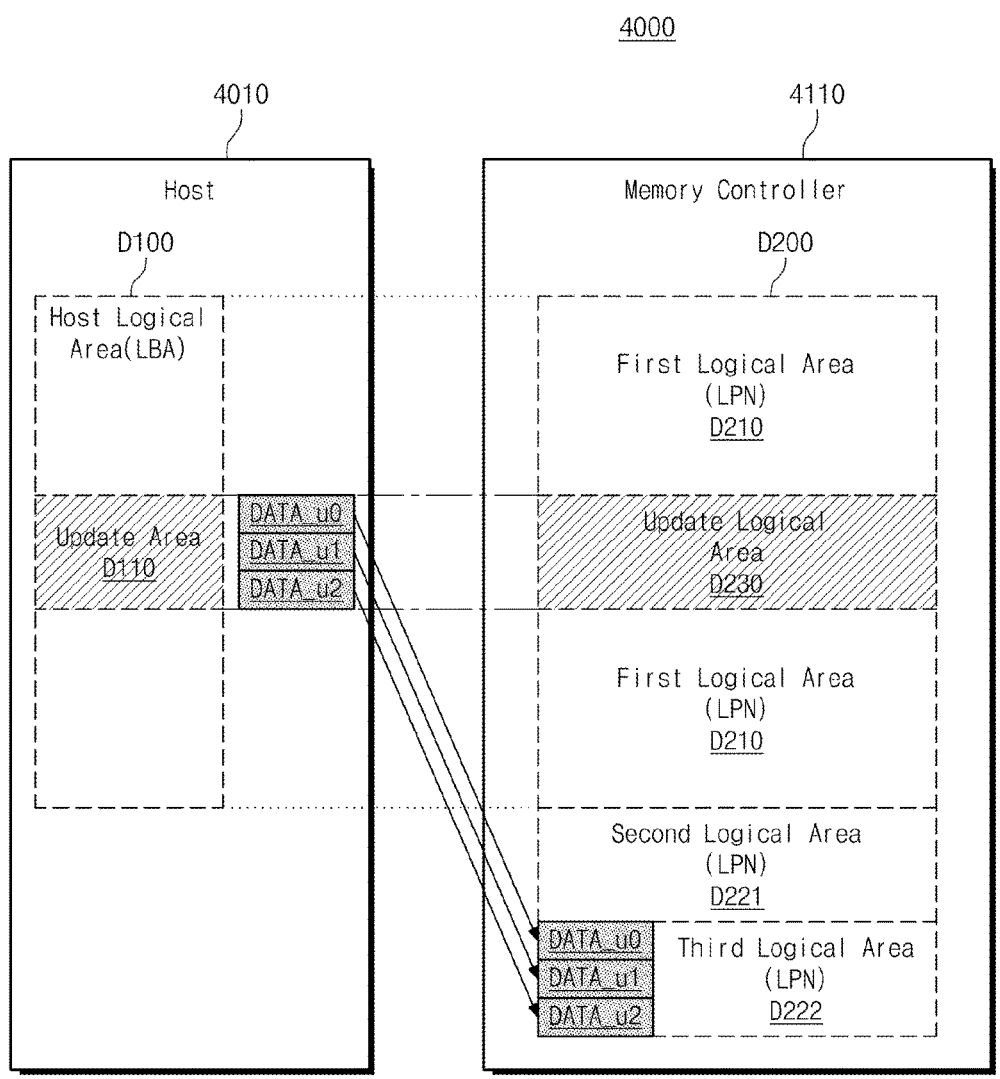
Figure 16:
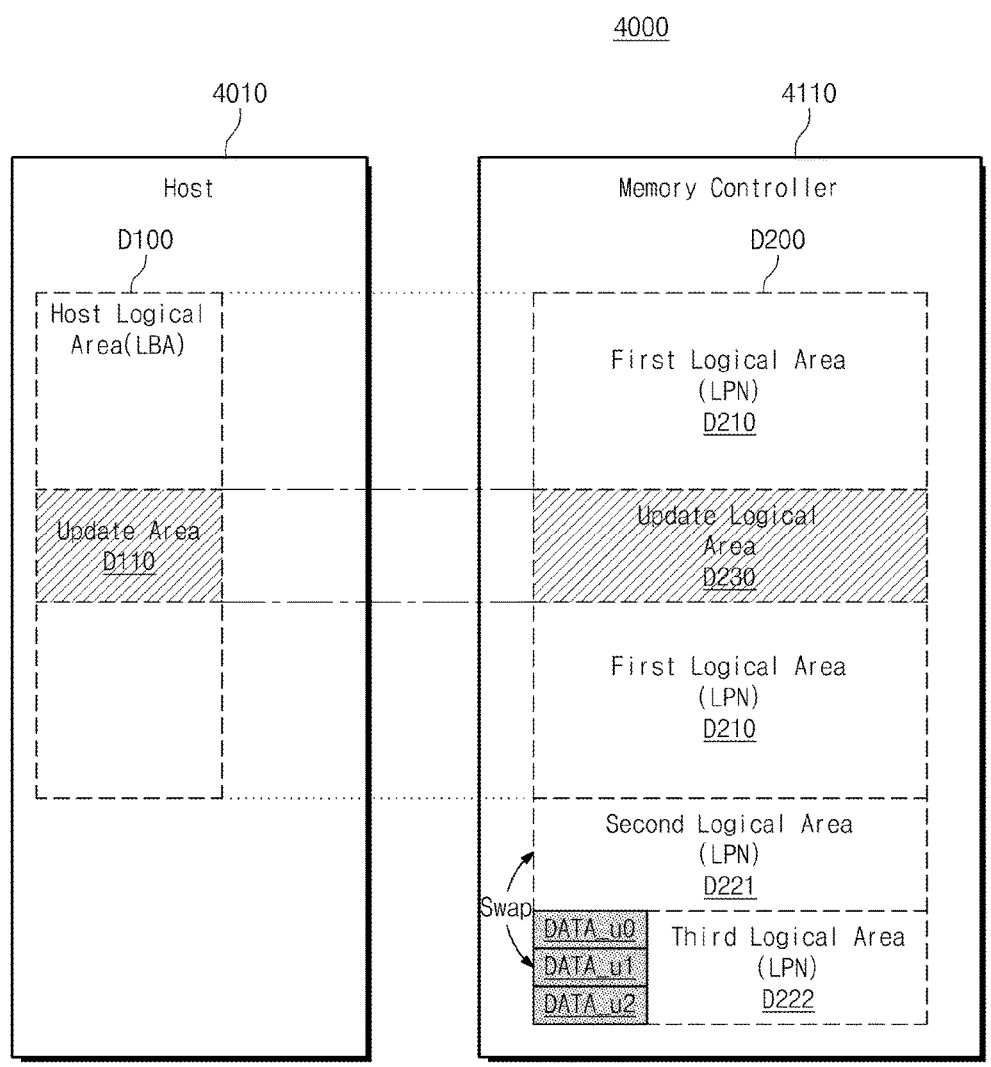

FIGS. 14 through 16 are a flowchart and block diagrams illustrating an operation of a memory controller in accordance with another embodiment of the inventive concept. Referring to FIGS. 1 and 14 through 16, since steps S210 through S230 are the same as the steps S110 through S130, a description thereof is omitted.

In a step S240, the memory controller 4110 can redirect a received logical block address LBA to a logical page number LPN so that update data is written in a third logical area D222.

As illustrated in FIG. 15, a logical area D200 managed by the memory controller 4100 may include first through third logical areas D210, D221 and D222. The first logical area D210 may be a user area, the second logical area D221 may be a main pre-boot area and the third logical area D222 may be a sub pre-boot area.

In the case when a pre-boot authentication is not performed, the memory controller 4110 may redirect a logical block address LBA so that a host 4010 recognizes the second logical area D221 (that is, a main pre-boot area or a main sMBR area) as a host view D100.

When an update operation is performed with respect to the second logical area D221, the memory controller 4110 redirects the logical block address LBA so that update data DATA_u0~DATA_u2 are written in the third logical area D222. At this time, the second and third logical areas D221 and D222 are logically divided areas and may be a logical storage area which is not recognized by the host 4101.

After the update data DATA_u0~DATA_u2 are all updated in the third logical area D222, in a step S250, the memory controller 4110 may swap the third logical area D222 and the second logical area D221. For example, the memory controller 4110, as illustrated in FIG. 16, can set the third logical area D222 in which the update data DATA_u0~DATA_u2 are stored as a main sMBR logical area and the second logical area D221 as a sub sMBR logical area. After that, in the case that a pre-boot authentication is required, the memory controller 4110 redirects a start logical block address LBA0 so that the third logical area D222 set as the main sMBR logical area is recognized as a host view D100. After that, when an update with respect to the pre-boot area is required, the memory controller 4100 may write update data in the second logical area D221 set as the sub sMBR logical area.

The operation methods of the memory controller 4110 described with reference to FIGS. 15 and 16 may be applied even in the case when the update area D110 is fragmented.

According to some embodiments of the inventive concept, when a pre-boot area is updated, a user system having improved reliability and performance is provided by writing update data in the pre-boot area.

Figure 17:
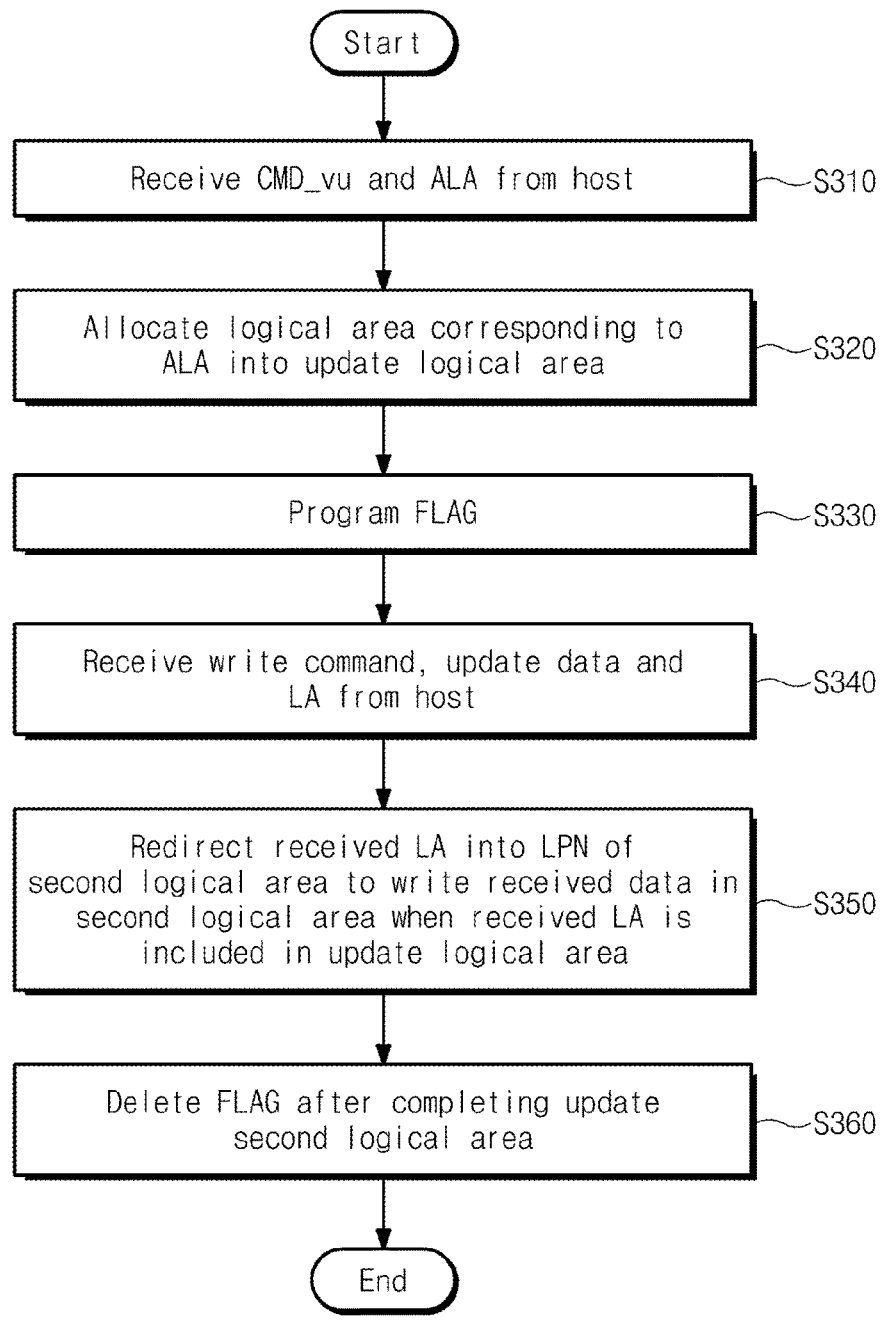
FIG. 17 is a flowchart illustrating an operation of a memory controller in accordance with another embodiment of the inventive concept.
Figure 18:
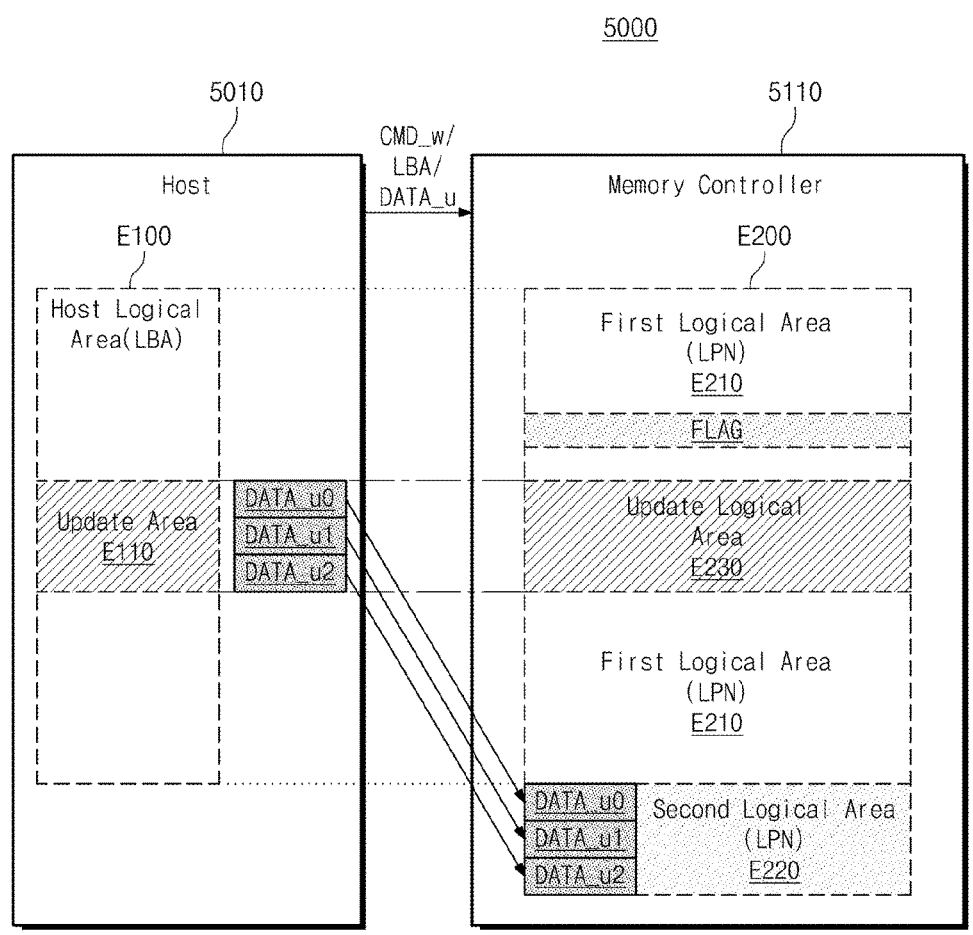
FIG. 18 is a block diagram for explaining the operation illustrated in FIG. 17.

FIG. 17 is a flowchart illustrating an operation of a memory controller in accordance with another embodiment of the inventive concept. FIG. 18 is a block diagram for explaining the operation illustrated in FIG. 17. Referring to FIGS. 17 and 18, since steps S310 and S320 are the same as the steps S110 and S120 of FIG. 11, a description thereof is omitted.

In a step S330, the memory controller 5110 programs flag information FLAG. The flag information FLAG is information indicating that a second logical area E220 is being updated. For example, as illustrated in FIG. 18, the memory controller 5110 can write the flag information FLAG in a first logical area E210 (i.e., a user area). The flag information FLAG may be provided by one of various patterns such as data of a specific pattern, random data pattern, or one bit data pattern.

The flag information FLAG may be programmed according to a control of a host 5010. The host 5010 may read a master boot record MBR included in the first logical area E210 together with the flag information FLAG.

After that, the memory controller 5110 performs steps S340 through S360. Since the steps S340 through S360 are the same as the steps S130 through S150 of FIG. 11, a description thereof is omitted.

After that, in the step S360, the memory controller 5110 erases flag information FLAG of the first logical area E210. For example, after an update operation is completed, the memory controller 5110 may erase the flag information FLAG according to a control of the host 5010. In this case, when the host 5010 reads the master boot record MBR included in the first logical area E210, the flag information FLAG is not read.

According to some other embodiments of the inventive concept, when updating a second logical area (that is, a pre-boot area), the memory controller 5110 writes the flag information FLAG. In this case, when the power supply is shut off (i.e., sudden power off) while updating the second logical area or an update operation stops due to an external factor, the host 5010 can recognize that the second logical area is being updated on the basis of the flag information FLAG. Thus, reliability of update operation with respect to the second logical area is improved.

The host 5010 reads the master boot record MBR (not shown) of the first logical area E210 and executes the read master boot record MBR and thereby the flag information FLAG may be read.

Figure 19:
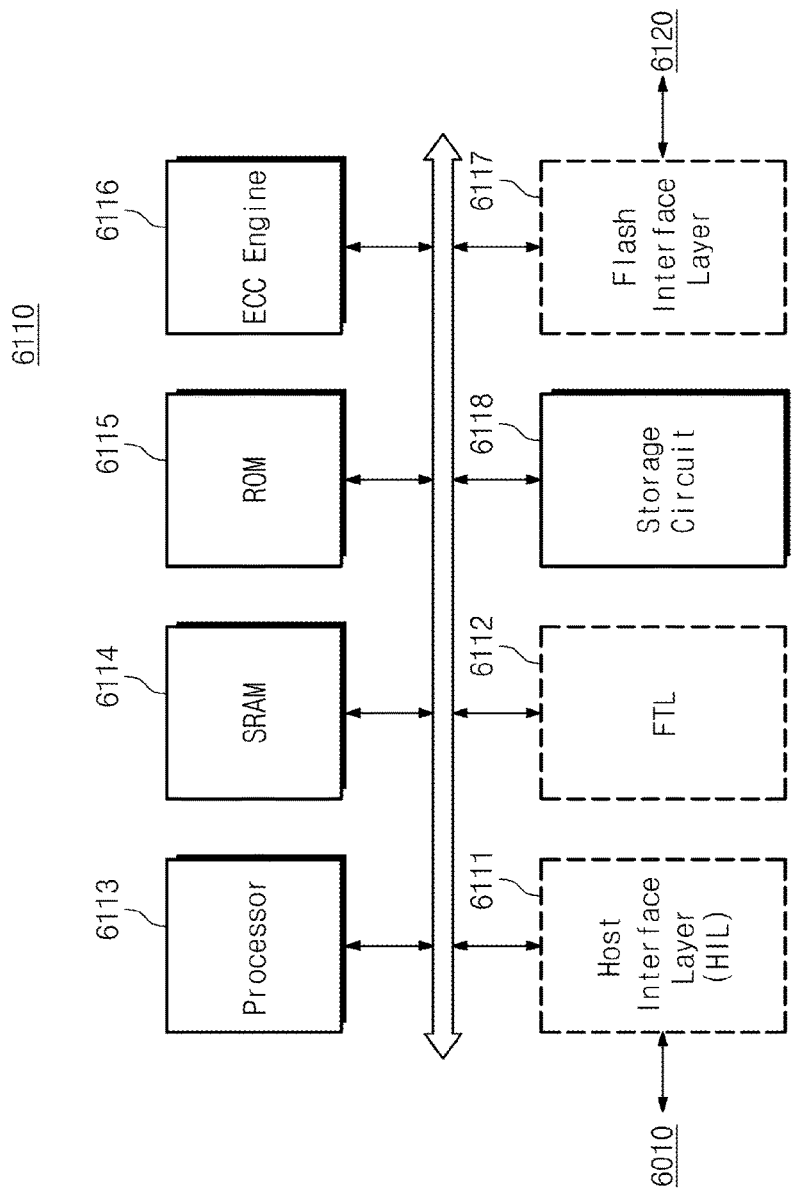
FIG. 19 is a block diagram illustrating a memory controller in accordance with still another embodiment of the inventive concept.

FIG. 19 is a block diagram illustrating a memory controller in accordance with still another embodiment of the inventive concept. Referring to FIG. 19, a memory controller 6110 may include a host interface layer 6111, a flash translation layer 6112, a processor 6113, an SRAM 6114, a ROM 6115, an ECC engine 6116, a flash interface layer 6117, and a storage circuit 6118. Since the host interface layer 6111, the flash translation layer 6112, the processor 6113, the SRAM 6114, the ROM 6115, the ECC engine 6116, and the flash interface layer 6117 were described with reference to FIGS. 2 and 3, a description thereof is omitted.

The memory controller 6110 further includes the storage circuit 6118 compared with the memory controller 1110 of FIG. 3. The storage circuit 6118 may be embodied by a storage medium such as a fuse circuit, a register circuit, etc. When updating a second logical area (i.e., a pre-boot area), the memory controller 6110 can store flag information FLAG in the storage circuit 6118. For example, the host 6010 can transmit a command CMD-vu (i.e., vender command), and information ALA of an update area to the memory controller 6110 to update the second logical area. The memory controller 6110 can allocate a logical storage area corresponding to the information ALA of the update area as an update logical area and can store the flag information FLAG in the storage circuit 6118. The flag information FLAG can be provided by any one of various patterns such as data of a specific pattern, arbitrary data, or one bit.

After completing an update operation, the memory controller 6110 can erase the flag information FLAG stored in the storage circuit 6118. For example, the memory controller 6110 can judge whether update data are all written in the second logical area. When update data are all written in the second logical area, the memory controller 6110 can erase the flag information FLAG stored in the storage circuit 6118. The host 6010 can transmit information indicating that an update with respect to the second logical area is completed to the memory controller 6110. At this time, the memory controller 6110 can erase the flag information FLAG stored in the storage circuit 6118 in response to received information.

Figure 20:
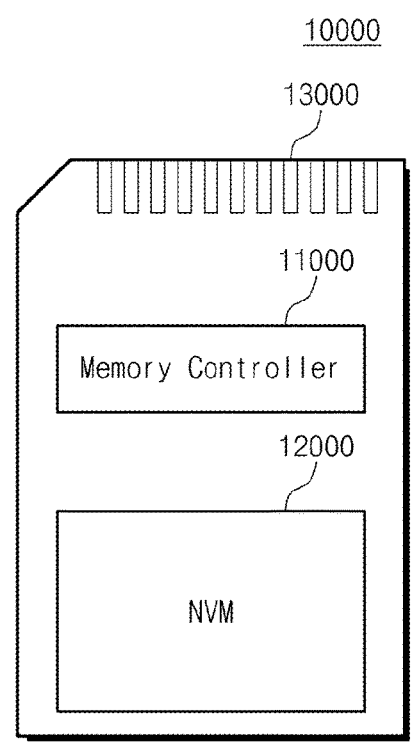
FIG. 20 is a block diagram illustrating a memory card system including a nonvolatile memory system in accordance with some embodiments of the inventive concept.

FIG. 20 is a block diagram illustrating a memory card system including a nonvolatile memory system in accordance with some embodiments of the inventive concept. Referring to FIG. 20, the memory card system 10000 includes a controller 11000, a nonvolatile memory 12000, and a connector 13000.

The controller 11000 is connected to the nonvolatile memory 12000. The controller 11000 is configured to access the nonvolatile memory 12000. For example, the controller 11000 is configured to control read, write, erase and background operations of the nonvolatile memory 12000. The controller 11000 is configured to provide an interface between the nonvolatile memory 12000 and a host. The controller 11000 is configured to drive firmware for controlling the nonvolatile memory 12000.

The controller 11000 may include constituent elements such as a RAM (random access memory), a processing unit, a host interface, a memory interface, an error correction unit, etc. The controller 11000 can communicate with an external device through the connector 13000. The controller 11000 can communicate with an external device (e.g., host) according to a specific communication standard.

The controller 10000 may be the memory controller described with reference to FIGS. 1 through 19. The nonvolatile memory 12000 can be embodied by various nonvolatile memory devices such as an EPROM (electrically erasable and programmable ROM), a NAND flash memory, a NOR flash memory, a PRAM (phase-change RAM), a ReRAM (resistive RAM), a FRAM (ferroelectric RAM), a STT-MRAM (spin-torque magnetic RAM), etc.

The controller 11000 and the nonvolatile memory 12000 can be integrated in one semiconductor device. The controller 11000 and the nonvolatile memory 12000 can be integrated in one semiconductor device to define a solid state drive SSD. The controller 11000 and the nonvolatile memory 12000 can be integrated in one semiconductor device to define a memory card. For example, the controller 11000 and the nonvolatile memory 12000 can be integrated in one semiconductor device to define a memory card such as a personal computer memory card international association (PCMCIA) card, a compact flash (CF) card, a smart media card (SM, SMC), a memory stick, a multimedia card (MMC, RS-MMC, MMCmicro), an SD card (SD, miniSD, microSD, SDHC), a universal flash memory device (UFS), etc.

The memory card system 10000 can support a SED (self encryption drive) and the memory controller 11000 can manage a pre-boot area. The memory card system 10000 can perform an update operation with respect to the pre-boot area on the basis of the method described with reference to FIGS. 1 through 19.

Figure 21:
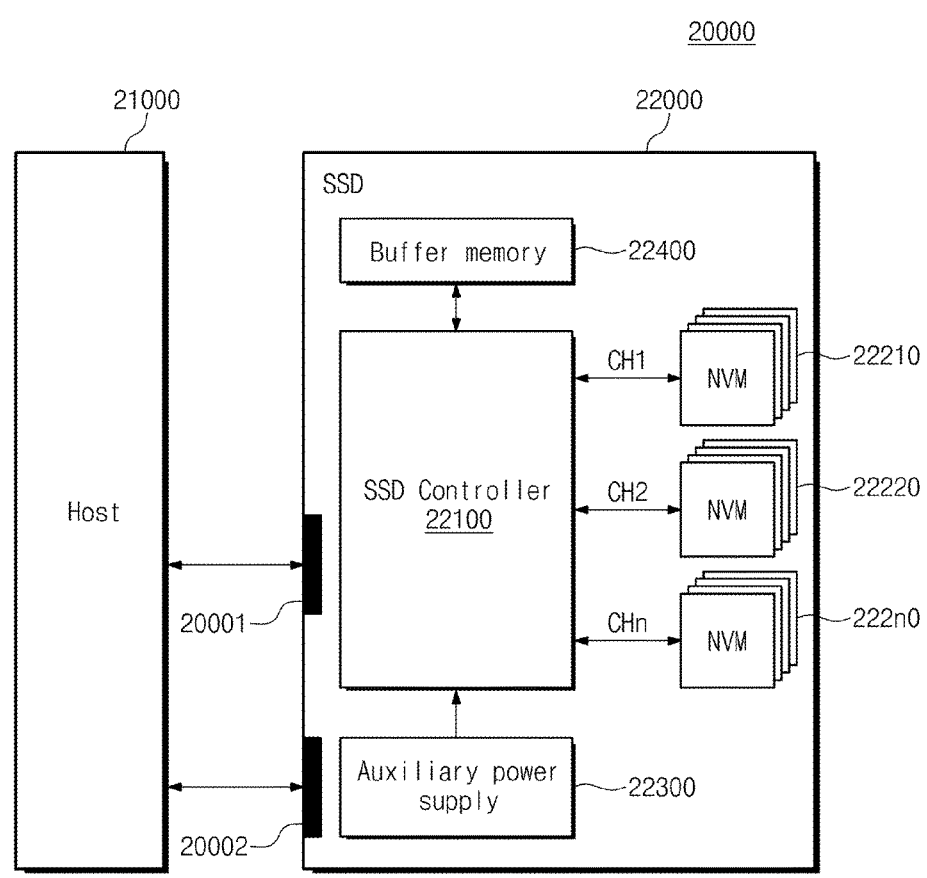
FIG. 21 is a block diagram illustrating a SSD (solid state drive) system including a nonvolatile memory system in accordance with some embodiments of the inventive concept.

FIG. 21 is a block diagram illustrating an SSD (solid state drive) system including a nonvolatile memory system in accordance with some embodiments of the inventive concept. Referring to FIG. 21, an SSD system 20000 includes a host 21000 and an SSD 22000.

The SSD 22000 exchanges a signal with the host 21000 through a signal connector 20001 and is inputted with power through a power connector 20002. The SSD 22000 may include a plurality of flash memories 22210-222$n$0, an SSD controller 22100, an auxiliary power supply 22300 and a buffer memory 22400.

The SSD controller 22100 can control the flash memories 22210-222$n$0 in response to a signal SIG received from the host 21000. The signal SIG may be signals based on an interface of the host 21000 and the SSD 22000. The SSD controller 22100 may be the memory controller described with reference to FIGS. 1 through 19.

The auxiliary power supply 22300 is connected to the host 21000 through the power connector 20002. The auxiliary power supply 22300 can receive power PWR from the host 21000 to charge it. In the case when power is not smoothly supplied from the host 21000, the auxiliary power supply 22300 may provide power of the SSD system 20000. The auxiliary power supply 22300 can be located inside or outside the SSD 22000. For example, the auxiliary power supply 22300 is located on a main board and can provide auxiliary power to the SSD 22000.

The buffer memory 22400 operates as a buffer memory of the SSD 22000. For example, the buffer memory 22400 can temporarily store data received from the host 21000, data received from the flash memories 22210-222$n$0, or meta data (for example, a mapping table) of the flash memories 22210-222$n$0. The buffer memory 22400 may include a volatile memory such as DRAM, SDRAM, DDR SDRAM, LPDDR SDRAM, GRAM, etc. or a nonvolatile memory such as FRAM, ReRAM, STT-MRAM, PRAM, etc.

The SSD controller 22100 can operate based on the operation method described with reference to FIGS. 1 through 19. The SSD controller 22100 may be provided by a removable drive. The SSD 22000 may be used as an auxiliary storage medium or an outer-mounted storage medium of the host 21000.

Figure 22:
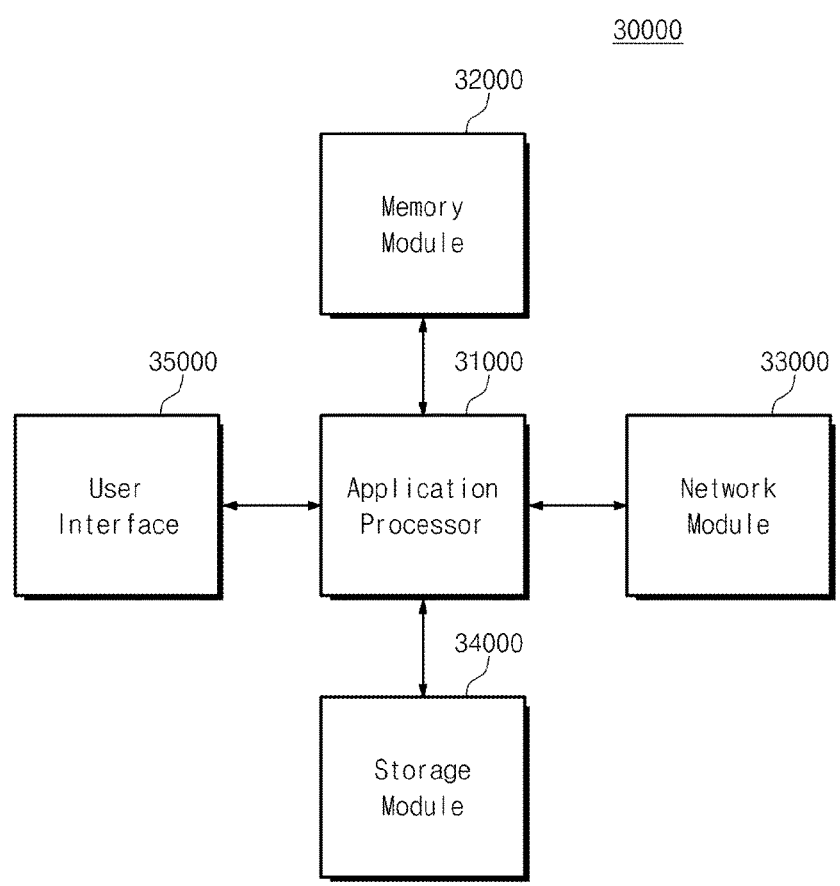
FIG. 22 is a block diagram illustrating a user system including a nonvolatile memory system in accordance with some embodiments of the inventive concept.

FIG. 22 is a block diagram illustrating a user system including a nonvolatile memory system in accordance with some embodiments of the inventive concept. Referring to FIG. 22, a user system 30000 includes an application processor 31000, a memory module 32000, a network module 33000, a storage module 34000 and a user interface 35000.

The application processor 31000 can drive constituent elements and an operating system OS that are included in the user system 30000. The application processor 31000 may include controllers controlling constituent elements included in the user system 2000, a graphic engine, and various interfaces. The application processor 31000 may be provided by a system-on-chip SoC.

The memory module 32000 can operate as a main memory, an operation memory, a buffer memory or a cache memory. The memory module 32000 may include a volatile random access memory such as DRAM, SDRAM, DDR SDRAM, DDR2 SDRAM, DDR3 SDRAM, LPDDR DRAM, LPDDR2 DRAM, LPDDR3 DRAM, etc. or a nonvolatile random access memory such as PRAM, ReRAM, MRAM, FRAM, etc. The application processor 31000 and the memory module 32000 can be packaged and mounted on the basis of a POP (package on package).

The network module 33000 can perform a communication with external devices. The network module 33000 can support a wireless communication such as a CDMA (code division multiple access), a GSM (global system for mobile communication), a WCDMA (wideband CDMA), a CDMA-2000, a TDMA (time division multiple access), a LTE (long term evolution), a Wimax, a WLAN, a UWB, a blue tooth, a WI-DI, etc. The network module 33000 may be included in the application processor 31000.

The storage module 34000 can store data. For example, the storage module 34000 can store data received from the application processor 31000. The storage module 34000 can transmit data stored in the storage module 34000 to the application processor 31000. The storage module 34000 can be embodied by a nonvolatile semiconductor memory device such as a PRAM, an MRAM, an RRAM, a NAND flash, a NOR flash, a three-dimensional NAND flash, etc. The storage module 34000 may be provided by a removable drive such as a memory card, an outer-mounted drive, etc. of the user system 30000.

The storage module 34000 may be the nonvolatile memory system described with reference to FIGS. 1 through 19.

The user interface 35000 may include interfaces that input data or a command into the application processor 31000 or output data to an external device. The user interface 35000 may include user input interfaces such as a keyboard, a keypad, a button, a touch panel, a touch screen, a touch pad, a touch ball, a camera, a mike, a gyroscope sensor, a vibration sensor, etc. The user interface 35000 may include user output interfaces such as a liquid crystal display (LCD), an organic light emitting diode (OLED) display, an active matrix OLED (AMOLED) display, an LED, a speaker, a motor, etc.

According to embodiments of the inventive concept, a nonvolatile memory system includes a memory controller and a nonvolatile memory device. The memory controller can divide the nonvolatile memory device into first and second logical areas to manage them. The first logical area may indicate a user area in which data is stored or read by a host (or user) and the second logical area may indicate a pre-boot area for a pre-boot authentication. A host connected to the nonvolatile memory system can update the second logical area. At this time, the host allocates a part of the first logical area as an area for updating the second logical area and provides information of the allocated logical area to the memory controller. The memory controller writes data in the second logical area which is not the allocated logical area to update the second logical area in response to a write command corresponding to the allocated logical area. Thus, a nonvolatile memory system having improved reliability and performance is provided.

According to the inventive concept, when updating a shadow master boot record, update data is written in a pre-boot area (or a shadow master boot record area) by redirecting a logical block address so that data is written in the shadow master boot record which is not an allocated update area. Thus, since the allocated update area does not have to have a continuous logical address, an operation method of a memory controller having improved reliability and performance and a nonvolatile memory system including the memory controller are provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A nonvolatile memory system comprising:
a nonvolatile memory device comprising a physical storage area; and
a memory controller configured to manage the physical storage area on a basis of first and second logical areas, and being configured to receive a logical block address range corresponding to a part of the first logical area and a command from a host, and being configured to receive data, a logical block address and a write command from the host to perform an update of the second logical area;
the memory controller being configured, in response to the write command, when the received logical block address is included in the logical block address range in the update operation, to redirect the received logical block address to a logical page number of the second logical area so that the data is written in the second logical area.

2. The nonvolatile memory system of claim 1, wherein in a booting operation, the memory controller is configured to receive a start logical block address from the host; wherein before a pre-boot authentication is performed, the memory controller is configured to redirect the start logical block address to the logical page number of the second logical area so that the second logical area is recognized as a storage area by the host; and wherein when the pre-boot authentication is completed, the memory controller is configured to redirect the start logical block address to a logical page number of the first logical area so that the first logical area is recognized as a storage area by the host.

3. The nonvolatile memory system of claim 1, wherein the first logical area comprises a master boot record including information related to a size, a type, and a state of the first logical area, and the second logical area comprises a shadow master boot record including information related to a size, a type, and a state of the second logical area.

4. The nonvolatile memory system of claim 3, wherein in a booting operation, the memory controller is configured to receive a start logical block address from the host; wherein before a pre-boot authentication is performed, the memory controller is configured to redirect the start logical block address to the logical page number of the second logical area so that the shadow master boot record is read by the host; and wherein when the pre-boot authentication is completed, the memory controller is configured to redirect the start logical block address to a logical page number of the first logical area so that the master boot record is read by the host.

5. The nonvolatile memory system of claim 4, wherein when the shadow master boot record is read by the host, the second logical area is recognized as the storage area by the host; and wherein when the master boot record is read by the host, the first logical area is recognized as the storage area by the host.

6. The nonvolatile memory system of claim 1, wherein the memory controller is configured to write flag information, indicating the update of the second storage area, in a part of the first logical area in response to the command.

7. The nonvolatile memory system of claim 6, wherein the memory controller is configured to erase the flag information when the update of the second logical area is completed.

8. The nonvolatile memory system of claim 1, wherein the memory controller comprises a storage circuit and is configured to write flag information indicating the update of the second logical area in the storage circuit in response to the command.

9. The nonvolatile memory system of claim 1, wherein the command comprises at least one of a combination of commands defined by an interface standard between the memory controller and the host, a preliminary command and a vendor command.

10. The nonvolatile memory system of claim 1, wherein the memory controller comprises a host interface layer configured to selectively redirect the logical block address received from the host to any logical page number of the first and second logical areas.

11. The nonvolatile memory system of claim 1, wherein the memory controller is configured to manage a corresponding relation between logical page numbers of the first and second logical areas and physical page numbers of the physical storage area.

12. The nonvolatile memory system of claim 11, wherein the memory controller is configured to write the data in the physical storage area on the basis of the corresponding relation and the redirected logical page number.

13. A nonvolatile memory system comprising:
a nonvolatile memory device comprising a physical storage area; and
a memory controller configured to manage the physical storage area on a basis of first, second and third logical areas, and configured to receive a logical block address range corresponding to a part of the first logical area and a command from a host, and configured to receive data, a logical block address and a write command from the host to perform an update of the second logical area;
the memory controller being configured, in response to the write command, when the received logical block address is included in the logical block address range, to redirect the received logical block address to a logical page number of the third logical area so that the data is written in the third logical area.

14. The nonvolatile memory system of claim 13, wherein the first logical area comprises a user area in which user data is written and read by the host, the second logical area comprises a main pre-boot area for a pre-boot authentication, and the third logical area comprises a sub pre-boot area for an update of the second logical area.

15. The nonvolatile memory system of claim 14, wherein the memory controller is configured to set the second logical area as the sub pre-boot area and set the third logical area as the main pre-boot area.

16. The nonvolatile memory system of claim 15, wherein when the nonvolatile memory system is connected to the host after an update with respect to the second logical area is completed, the memory controller is configured to receive a start logical block address from the host and redirect the start logical block address so that any one of the third logical area and the first logical area in which the data are written is recognized as a storage area by the host.

17. A method of operating a nonvolatile memory system including a nonvolatile memory device comprising a physical storage area and a memory controller configured to manage the physical storage area, the method comprising:
managing the physical storage area with the memory controller on a basis of first and second logical areas, including receiving a logical block address range corresponding to a part of the first logical area and a command from a host, and receiving data, a logical block address and a write command from the host to perform an update of the second logical area; and
in response to the write command, the memory controller, when the received logical block address is included in the logical block address range in the update operation, redirects the received logical block address to a logical page number of the second logical area so that the data is written in the second logical area.

18. The method of claim 17, wherein in a booting operation, the memory controller receives a start logical block address from the host; wherein before a pre-boot authentication is performed, the memory controller redirects the start logical block address to the logical page number of the second logical area so that the second logical area is recognized as a storage area by the host; and wherein when the pre-boot authentication is completed, the memory controller redirects the start logical block address to a logical page number of the first logical area so that the first logical area is recognized as a storage area by the host.

19. The method of claim 17, wherein the first logical area comprises a master boot record including information related to a size, a type, and a state of the first logical area, and the second logical area comprises a shadow master boot record including information related to a size, a type, and a state of the second logical area.

20. The method of claim 19, wherein in a booting operation, the memory controller receives a start logical block address from the host; wherein before a pre-boot authentication is performed, the memory controller redirects the start logical block address to the logical page number of the second logical area so that the shadow master boot record is read by the host; and wherein when the pre-boot authentication is completed, the memory controller redirects the start logical block address to a logical page number of the first logical area so that the master boot record is read by the host.

* * * * *